(12) United States Patent
Doken

(10) Patent No.: US 12,348,510 B2
(45) Date of Patent: Jul. 1, 2025

(54) METHOD, SYSTEM AND APPARATUS OF AUTHENTICATING USER AFFILIATION FOR AN AVATAR DISPLAYED ON A DIGITAL PLATFORM

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 99 days.

(21) Appl. No.: 18/087,988

(22) Filed: Dec. 23, 2022

(65) Prior Publication Data

US 2024/0214372 A1 Jun. 27, 2024

(51) Int. Cl.
*H04L 9/40* (2022.01)
*G06F 21/36* (2013.01)

(52) U.S. Cl.
CPC ............ *H04L 63/083* (2013.01); *G06F 21/36* (2013.01)

(58) Field of Classification Search
CPC ............................... H04L 63/083; G06F 21/36
USPC .......................................................... 726/7
See application file for complete search history.

(56) References Cited

U.S. PATENT DOCUMENTS

| | | | |
|---|---|---|---|
| 11,546,322 B1 | 1/2023 | Hardjono et al. | |
| 2016/0236095 A1* | 8/2016 | Joo | A63F 13/537 |
| 2018/0330382 A1 | 11/2018 | Chen et al. | |
| 2019/0068373 A1 | 2/2019 | Konduru | |
| 2019/0349382 A1 | 11/2019 | Thomas | |
| 2020/0068389 A1 | 2/2020 | Rothkopf et al. | |
| 2023/0254300 A1 | 8/2023 | Silverstein et al. | |
| 2023/0291740 A1 | 9/2023 | Ashby | |
| 2023/0344634 A1* | 10/2023 | Patel | G06F 3/0481 |
| 2024/0157240 A1* | 5/2024 | Chayanam | A63F 13/55 |
| 2024/0169037 A1* | 5/2024 | Dravneek | G06F 21/31 |
| 2024/0214371 A1 | 6/2024 | Doken | |

OTHER PUBLICATIONS

Home of the Blender project—Free and Open 3D Creation Software, retrieved on Jan. 24, 2023 from https://www.blender.org (15 pages).
"Hey, You Stole My Avatar!: Virtual Reality and Its Risks to Identity P" by Jesse Lake (emory.edu), vol. 69, Issue 4, (2020) https://scholarlycommons.law.emory.edu/elj/vol69/iss4/5/ (48 pages).
Avatars: The art and science of social presence (fb.com) by Mike Howard, Apr. 3, 2019 https://tech.facebook.com/reality-labs/2019/04/avatars-the-art-and-science-of-social-presence/ (22 pages).

(Continued)

*Primary Examiner* — Lan Dai T Truong
(74) *Attorney, Agent, or Firm* — Haley Guiliano LLP

(57) ABSTRACT

A host server of a digital platform, such as a virtual world or augmented reality platform, receives a request to graphically indicate an affiliation between a user of an avatar and an organization or other entity. The host server queries an authenticating server to authenticate the affiliation between the user and the entity. Accordingly, the host server generates for display a logo, or other indication, to indicate the authenticated affiliation. Other users of the digital platform can learn whether the user of the avatar is actually affiliated with the entity. Access to digital spaces, virtual objects and some interactions of the avatar may be controlled according to an access policy of the entity.

17 Claims, 17 Drawing Sheets

(56) References Cited

OTHER PUBLICATIONS

Microsoft debuts AR/VR collaboration platform Mesh (techtarget.com), Lucas Matney, Mar. 2, 2021 https://www.techtarget.com/searchunifiedcommunications/news/252497279/Microsoft-debuts-AR-VR-collaboration-platform-Mesh (3 pages).
Introducing BlueJeans Space | BlueJeans Blog, Priyanka Mehta, Sep. 27, 2021 https://www.bluejeans.com/blog/introducing-bluejeans-spaces (6 pages).
3D Virtual Events Platform—MootUp; retrived on Jan. 24, 2023, https://mootup.com/ (12 pages).
Virtual Event & Conference Platform Solutions | MeetingPlay; retrieved on Jan. 24, 2023 https://www.meetingplay.com (16 pages).
AltspaceVR: Home—AltspaceVR (altvr.com) https://altvr.com/sunset/ Jan. 20, 2023 (3 pages).
Zuckerberg Wants You to Buy Digital Clothes for Your Avatar | PCMag, Michael Kan, Jun. 17, 2022 (8 pages).
D Virtual Events Platform—MootUp; retrived on Jan. 24, 2023, https://mootup.com/ (5 pages).
U.S. Appl. No. 18/087,985, filed Dec. 23, 2022, Serhad Doken.

\* cited by examiner

METHOD, SYSTEM AND APPARATUS OF AUTHENTICATING USER AFFILIATION FOR AN AVATAR DISPLAYED ON A DIGITAL PLATFORM

BACKGROUND

The present disclosure relates to digital platforms, including virtual computer-generated environments, that users navigate using avatars and, more particularly, to indicating that a user of an avatar is authenticated as being affiliated with an entity.

SUMMARY

Digital platforms, such as computer-generated virtual environments, are increasingly popular methods for people to interact within a networked system. Various on-line environments are known in which a three-dimensional (3D), a two-and-a-half dimensional (2.5D), or a two-dimensional (2D) physical world (actual or fantasy) is simulated.

Some environments of this type are referred to as "virtual reality" (VR) or "virtual reality universe" (VRU) environments. In known VRU environments, a portion of the actual world, or a portion of a fantasy universe, or a combination of the foregoing, is simulated within a computer system. Multiple players or users may participate in the environment through a computer network, such as a local area network or a wide area network (e.g., the internet). Each player is typically represented in the VRU environment by an "avatar."

Avatars allow people to represent themselves online in whatever way they want. Avatars may be considered alter-egos, since users may have the ability to customize characters that are completely different than their actual personality and appearance. Avatars are commonly used in multiplayer gaming, multiparty online communities, and web forums. Online multiplayer role-playing games (MMOGs) such as World of Warcraft and Fortnite allow users to create custom characters. These characters serve as the players' avatars. Online discussion boards typically require users to register and provide information about themselves. Many give users the option to select an image file that represents the user's persona. Avatars are also commonly used for virtual meeting applications that are using virtual spaces in a 2D world (meaning on a web browser or separate phone/PC based platform). Avatars on a video conferencing platform (like Zoom) may be mostly for fun or may include serious avatars that represent the user and the group to which it belongs.

There are numerous ways for a user to customize a user avatar to give a realistic view of a user's physical appearance or to generate an avatar that embodies a user's image of what the user may like to be perceived as on a digital platform. For instance, using applications like Oculus Horizon rooms, users can customize hairstyles, eye shapes, colors, eyebrows, choose from a seemingly infinite wardrobe of clothing options/styles, add accessories, such as hats, scarfs, glasses, tattoos, and the like, directly on their avatars with the editing tools. Players send inputs to a VRU engine to move their avatars around the VRU environment, and are able to cause interaction between their avatars and objects or other user avatars in the VRU. For example, a player's avatar may interact with an automated entity or person, simulated static objects, or avatars operated by other players. It is possible to record a state of a VRU environment so that users may log out of the VRU and, upon their return, resume an activity at the point where they left off.

The anonymity and lack of transparency to other users provided by avatars on digital platforms create technological problems. In VRU environments, because users often have a great degree of freedom when customizing avatars (e.g., rather than being forced to use a photo-realistic image or model of themselves), these environments afford users a degree of anonymity. While many users value this relative anonymity, it can also result in users not trusting others' claims about their identity (e.g., "I'm Bob") or affiliation (e.g., "we work at the same company"). Moreover, users cannot easily evaluate a person's facial expression or mannerisms the way they might in real-life to develop a sense of trust. This lack of trust negatively hampers social interactions in a VRU environment, making people less likely to open up to, and interact with, others. To the point about not trusting identities, many VRU environments display a handle or screen name, but these handles typically do not reveal the actual name or identity of a user, making verification of identity (let alone verification of any purported affiliations) more difficult for other users.

Regarding purported affiliations, VRU environments might benefit in multiple ways from leveraging these affiliations if technological solutions enabled them to be trusted. For example, some types of actions, user interactions, or user access on a digital platform might be made contingent on user affiliation. However, if users' assertions regarding certain affiliations cannot reliably be trusted, any digital platform wanting to rely on these assertions (e.g., to grant special functions, permissions, or access) cannot reliably do so. In other words, the inability to verify asserted affiliations is a technical challenge faced by platforms. At the same time, business enterprises, schools, government agencies, not-for-profits and other organizations are wary of how their members represent themselves online as member behavior may directly impact their brand, value and perceived integrity. Therefore, such entities often desire control over (or at least an awareness of) how their employees, students, contractors, or members behave in the online world, even while using an avatar on a digital platform. The entities may want users to use an identity in way that reflects well on their organization. At a minimum, they would prefer that members not present their organization in a negative light. Further, verification and affiliation tracking not only helps users foster trust with others—it helps users and platforms minimize the negative consequences of identity theft or account theft. For example, if an avatar's logo (showing affiliation with an organization or other entity) is used by someone impersonating a member of the community (employee of an enterprise, graduate of a college et cetera), this could have negative implications for that community/group/enterprise/entity. At the same time, users can logon to many digital platforms using different names they assign for themselves, and can change their email addresses, handles or avatars, which may make it difficult for other users of a digital platform to keep track of which user they are interacting with. This also undermines trust other users in online platforms, as users may not know with whom they are interfacing.

At a high level, the disclosed techniques may enable a system to: (i) authenticate affiliations visually indicated between users and entities (e.g., schools or companies) or (ii) control access (e.g., to areas, functions, abilities, items, etc.) based on authenticated affiliations.

Regarding authentication of affiliation, the described techniques enable a user to submit a request to graphically indicate an affiliation between herself and an entity. In response to this request, the affiliation may be authenticated, and the user may be granted the ability to graphically indicate the authenticated affiliation (e.g., by displaying, along with the avatar, a logo for the entity along with a checkmark).

To facilitate authentication and related techniques, this description discloses a method, a non-transitory computer-readable medium, a system, and means for providing such a system, for a host server to request authentication from an authentication server. In an embodiment, a host server of a digital platform receives, via a user interface, a request to graphically indicate an affiliation between an avatar and an entity. The host server may then query an authenticating server to authenticate the affiliation between a user of the avatar and the entity (e.g., an organization such as a school or company). The authentication server may be related to, or operated by, the entity, and it may be configured to determine whether the user of the avatar is, in fact, affiliated with the entity (e.g., based on records stored to memory). Based on a response received from the authenticating server, the host server may generate for display a graphical indication (e.g., a logo or other indication) indicating the authenticated affiliation between the user of the avatar and the entity. The digital platform providing the environment for the avatar may be configured such that displaying the logo verifies authentication of a relationship between the user or avatar and entity (i.e., the digital platform may prevent non-authenticated users from brandishing the logo; similarly, the digital platform may require authenticated users to display formal or authenticated logos [e.g., as opposed to logos not vetted by the entity]). In some embodiments, the digital platform does not prevent the display of informal or non-authenticated logos. In such embodiments, the digital platform may indicate an authenticated affiliation between a user and entity by displaying a second graphic indication to indicate that the affiliation has been authenticated (e.g., a checkmark). The secondary graphic indication may be displayed along with logo (e.g., overlaid or near the logo) to make clear to others that affiliation has been authenticated.

The avatar may be hosted in a multi-user computer-simulated virtual world provided by the host server. If desired, the digital platform or the authenticating server may save, in a user profile, an authentication status indicating that the affiliation between the user and the entity has been authenticated. This authentication state may be useful, for example, for future user sessions on the digital platform. The digital platform many enable, in a following session on the digital platform, based on the saved user profile, display of the authenticator logo with the avatar.

If desired, the authenticating of the affiliation for the avatar may be performed based on an identifier indicated in the response received from the authenticating server and saved at the authenticating server. For example, a unique (alpha)numerical ID may be created or retrieved by the authenticating server to associate the user with the logo and, according to an embodiment, additionally with the avatar, such that the identifier uniquely correlates the user and the logo with the avatar. For example, the ID "AFF28429" may uniquely correlate (i) a unique ID tied to a user or avatar (e.g., "UID2393") and (ii) a unique ID tied to an entity, such as a school (e.g., "EID0934").

In some embodiments, a method for authenticating affiliations may include submitting the query to the authenticating server according to a URL received from the user device by the host server. For example, the user may provide to the host server a URL that indicates a webpage of the authenticating server associated with the entity.

In some embodiments, a method for authenticating affiliations may include creating a logo receiving space on the avatar prior to receiving the request to associate. For example, a space on or near a lapel or breast pocket area of an avatar, or on or at a user handle or username on the digital platform If desired, the authenticator logo may be displayed as a badge on the avatar. By way of further example, a front area of a shirt or a forehead area of a cap worn by the avatar may be previously selected by the digital platform or by the user as the receiving space for a logo of affiliation.

In some embodiments, an authenticating process may include determining a rank or status of the user at the entity. In such embodiments, the system may generate for display the rank. For example, a display may be generated to display the logo and rank or status (e.g., with the rank near or over the logo). To illustrate, the logo may visually identify the user/avatar as a commercial airline pilot by display of pilot's insignia, of status as a prelate of a church, or of status as a university faculty member or administrator, as part of the logo.

In some embodiments, an authenticating process may include selecting a logo to be generated for display according to a type of the digital platform. For example, the authenticating server may distinguish among digital platforms on which a logo is to appear, such that a digital platform oriented toward a professional social network may features more official-looking logos, while a virtual world of a casual or social nature may have logos that do not include an official trademark logo of the entity (e.g., logos with a more casual style or design).

To facilitate authentication and related techniques, this description contemplates a method, a non-transitory computer-readable medium, a system, and means for an authenticator server to respond to an authentication request from a host server providing a digital platform. The method may include the authenticating server receiving a request to authenticate an affiliation of a user with an entity. The affiliation may be represented on the digital platform by a logo—identifying the entity—displayed with an avatar of the user. For example, the digital platform, or another user of the digital platform, may detect an avatar displayed with a logo that purports to represent an affiliation with an organization. Upon the detection, the digital platform or the other user may submit a request for authentication of the user affiliation. Continuing this example, the authenticating server may then take steps to authenticate the affiliation, by determining that the affiliation has been registered by the authenticating server In addition, the authenticating server may check that the logo has not been checked out to this user on this or another digital platform, which may indicate that the current request is not coming from a genuine user. Then the authenticating sever may transmit, based on the authenticating, to the host server that the association is authenticated.

In an embodiment, a user would first sign on the digital platform using, for example, a username and password to authenticate the user. Other ways of authenticating the user for using the digital platform are also contemplated. Then, the system may authenticate the affiliation of the user with an entity by prompting the user to transmit an identifier of the logo. The system may correlate the transmitted identifier with a logo for the affiliated entity previously saved by the authenticating server. For example, the user may be requested to scan, photograph or otherwise submit a unique identifier, such as a QR or other barcode, that the user has been issued by the affiliated entity or by the authenticating server. By way of illustration, the QR code or other barcode may be on a badge or nametag provided to employees of a company or to students of a school, and the user may scan this or upload this as evidence of affiliation with the entity (the company or the school) This received identifier may match a unique logo identifier stored to memory at the digital platform and/or at the authenticating server. Or the user may present biometric data as part of the identification.

In some embodiments, the request to authenticate may be received from the host server in several different circumstances. As a first example, the host server may detect display of a logo with the avatar. In response, it may request authentication automatically on its own. As a second example, the host server may receive—from a second user device used by a second user—indication of a detection of such a display. According to the latter example, the second user may request confirmation that the affiliation indicated by the logo is authentic. Specifically, the second user may request that the digital platform visually indicate that the affiliation has been authenticated. In response to receiving such a request, a host server for the digital platform may request authentication by the authenticating server. According to an embodiment, another user may request, from the authenticating server, authentication of an affiliation as indicated by a logo displayed with an avatar of a first user that the other user notices on the digital platform.

If desired, the request to authenticate may include a transmission to the authenticating server of a representation of an image of the logo and identification information for the avatar. For example, the request to authenticate may include capturing an image by a virtual camera or screen capture. Alternatively or additionally, the transmitted request to authenticate may be a message that identifies the user using a username, social security number or other user information, and the logo may be identified using a standard (alpha)numeric ID that has been assigned to each logo and/or to each affiliated entity.

In some embodiments, determining that an instance of the logo is currently available for the user on the digital platform may include determining that the instance of the logo has not been previously authenticated for the user. For example, it may be determined that this logo has not before been checked out to this user by the authenticating server. Or authentication may proceed if it is determined that the logo has been checked out to this user, but it has been checked back when the user logged off from a previous session on this or another digital platform.

In some embodiments, authenticating the affiliation may include determining that the logo adheres to a standard logo of the entity. For example, an authenticating server, pursuant to rules of an entity, may insist that a logo appearance adheres to one or more standard designs of the entity. The logo captured by the virtual camera and received by the authenticating server 320 may be read using known computer vision algorithms and compared automatically against the "official" logo, the logo received from the entity as a standard logo and stored by the authenticating server, for example, in a digital logo image store. If the logo does not sufficiently adhere to the standard logo, the system may not allow the user or avatar to hold him or herself out as having an authenticated affiliation. That is, despite having a legitimate (and perhaps authenticated) affiliation with an entity, the logo used by the avatar might fail a logo authentication (e.g., because it is not match a formally recognized or "authentic" logo endorsed by the entity). Accordingly, the server may transmit a message, indicating the failure to authenticate, to the host or user device. The message may indicate that the authentication failed due to the use of a non-standard or unapproved logo.

In some embodiments, the request to authenticate may be automatically generated. If desired, the request may be a message (or a part of a message) comprising data identifying the logo and the avatar detected on the digital platform. For example, the request may be automatically initiated by a digital platform when an avatar is modified to include or to be displayed in connection with a logo.

In some embodiments, the request to authenticate may be received from a second user device (e.g., associated with or used by a second user) of the digital platform. The second user, for example, may notice the avatar and logo displayed and may wish to request authentication of the affiliation of the first user as a prerequisite to conducting a transaction with, or obtaining information from, the avatar.

In some embodiments, authenticating may include querying the host server as to a current use of the logo on the digital platform. According to an embodiment, when a logo is authenticated for a user, the host server may keep track of a "check out status" of the logo for the user. Further use of the logo by this user, for example, by another avatar of the user, or by another login to the digital platform purporting to be this user, may be disallowed by the digital platform. In an embodiment, the digital platform may be queried by other digital platforms regarding the checkout status of the logo for this user, and the digital platform may reply to such queries with an indication as to whether the logo is currently checked out to this user. If desired, another digital platform may query the authenticating server regarding the checkout status of the logo for the user, and the authenticating server may query digital platforms as to the checkout status.

Turning to access control techniques, this disclosure contemplates an access control method, a non-transitory computer-readable medium, a system, and means for access control based on affiliation of a user of a digital platform. Such a method may include receiving, via a user interface, a request to access, by the avatar of the user, a portion of the digital platform, the avatar visibly displayed with a logo identifying an entity outside the digital platform. For example, the user avatar displayed with a logo indicating an affiliation may be navigated in a digital platform, augmented reality space or other digital environment to a restricted space, for example, a meeting restricted to employees of an entity noted as having manager status at the entity. Accordingly, a digital platform may determine, based on the authenticated affiliation, that the entity has approved access of the avatar to the portion of the digital platform, and would enable, in response to the determining, the access of the avatar with the logo to the portion of the digital platform.

In some instances, the access control method may include, in response to the determining, preventing the avatar from accessing a second portion of the digital platform. For example, the second portion may be an area associated with a different entity. As another example, the second portion may be affiliated with the same entity, but it may require a higher level of privilege than what the user has been granted. In any event, in response to the determination, access of the avatar may be prevented. Similarly, other avatars not having an authenticated affiliation matching that required by the second portion may be denied access to the second portion. For example, the second portion may be accessible only to faculty of a particular institution. Accordingly, an avatar without any authenticated affiliation may be denied access. Similarly, an avatar having an authenticated affiliation as a student (and not faculty) at the institution may be denied access.

The access control method may include obtaining an access policy from an authenticating server, and granting or denying access according to the access policy. In such a method the portion of the digital platform may be a virtual space, may be a virtual object, may be interaction with a second avatar, may be an action or type of interaction of the avatar, or a combination of two or more of the foregoing.

If desired, the access control method may include querying an authenticating server of the entity for approval of the access. For example, a query may be sent in real time after access is requested. Alternatively, the query may be sent when the logo is first authenticated for the user. A list of access information or access policies may be stored by the digital platform for the user, for example, in a user profile.

In some embodiments, the digital platform may be a multi-user virtual world platform. In an embodiment, the logo may be a badge displayed on the avatar.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
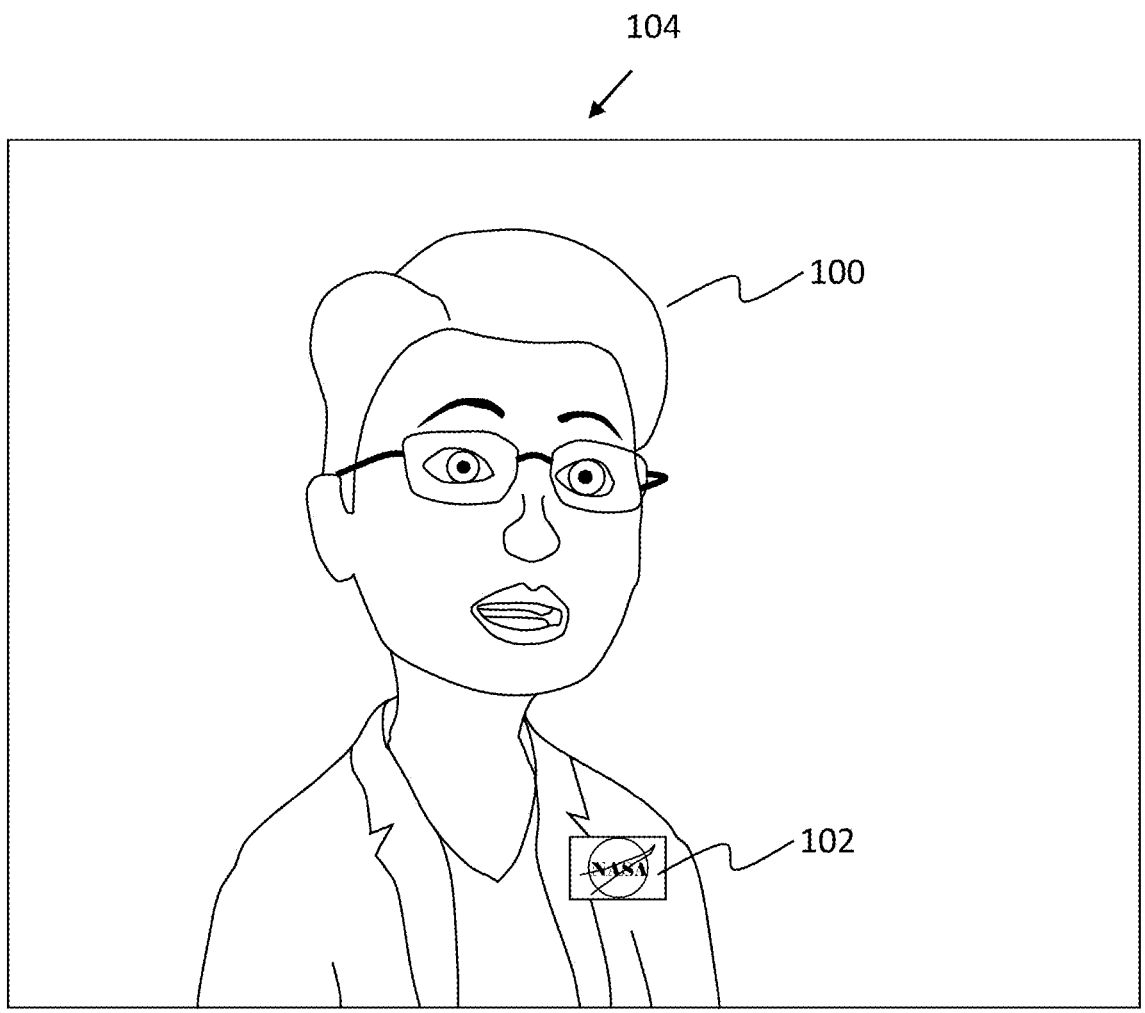
FIG. 1 shows an illustrative example of a display of an avatar with a logo of an affiliated entity on a digital platform, according to an aspect of the disclosure.

For simplicity and clarity of illustration, where considered appropriate, reference numerals may be repeated among the figures to indicate corresponding or analogous elements. In addition, numerous specific details are set forth in order to provide a thorough understanding of the embodiments described herein. However, the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

Figure 2:
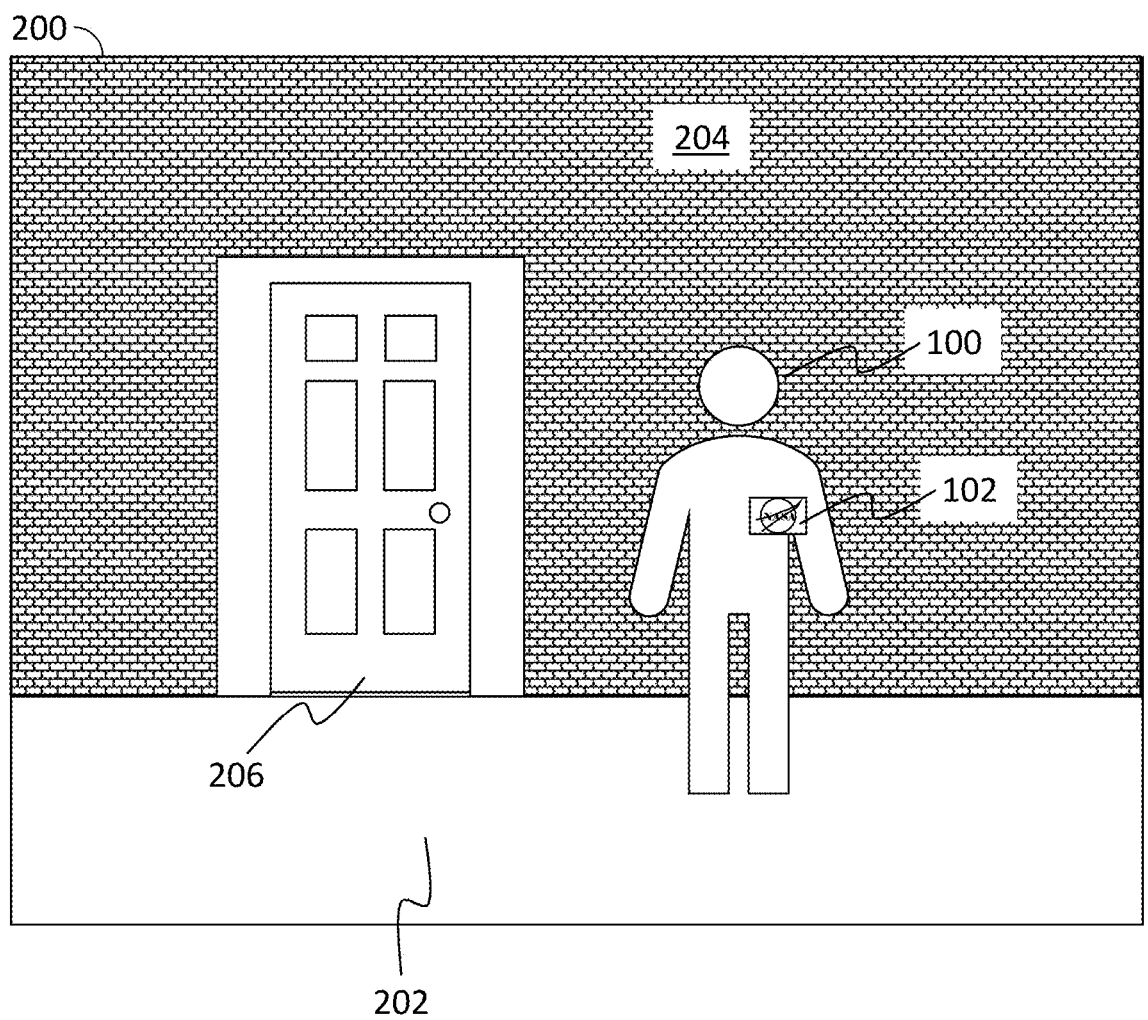
FIG. 2 shows an illustrative example of access control for display of an avatar with a logo in a virtual space of a virtual world as an example of a digital platform, according to an aspect of the disclosure.

Examples of avatars are illustrated in FIGS. 1 and 2. Generally speaking, an "avatar" is a graphical representation (e.g., a 2D or 3D image or model) of a person or user on a digital platform (e.g., a VRU environment or game). In a 3D VRU, for example, an avatar may be a 3D model linked to a particular user or character "played" by the user. In some instances, an avatar may be a 2D image linked to a particular user or character (e.g., a profile picture).

Generally speaking, a "digital platform" may be any suitable interactive environment or service provided by a computer-based system. The described digital platforms may be support multiple users, who may interact with each other via virtual identities or avatars. In some embodiments, one or more of the digital platforms is a VRU or multiplayer gaming platform. In some embodiments, one or more of the digital platforms is a social networking service or blogging platform on which users interact with each other by posting or sharing messages. According to an embodiment, in an implementation as a social networking service or blogging/messaging platform, video platform, social audio room like Clubhouse or the like, users may have profile pictures that are considered avatars.

Some digital platforms may enable users to import avatars (e.g., from other platforms or from cloud storage for the users). In some instances, digital platforms may enable users to utilize plugins for designing or customizing avatars. Avatars may be provided as realistic or near realistic depictions of people, animals, fantasy creatures, objects, actual or imagined, realistic or whimsical, or combinations of the foregoing, represented by one or more photographs, drawings, paintings, or other images; or may be stylized, cartoon, animated or the like. In some instances, avatars may be or may include video or audio content (e.g., an avatar may have an identifiable and relatively unique voice or set of audio expressions). For example, in an embodiment, an avatar is typically static. If desired, the digital platform and avatar may be configured such that, when a second user clicks on the avatar or gazes at the avatar for a time exceeding a threshold, the video or audio content plays. In some instances, avatars may be created as whimsical creatures or created objects according to the imagination of the user. According to a further aspect of the disclosure, avatars may be provided as one or more still photographs or videos, or an avatar may be an image of one or more real-world or simulated objects that the user wishes to be a stand-in for himself or herself. Avatars may be displayed as 2D images or as 3D models. In some instances, avatars may be displayed with a logo of affiliation (e.g., displayed as a badge or floating icon near the avatar).

Generally speaking, a "logo" may be any graphical symbol, mark, or model (e.g., including text, an image, 3D models, etc.) from which an entity is identifiable. Typically, a designer designs a logo for an entity in a manner intended to indicate an association with the entity (e.g., wherein the entity is identifiable by viewing the logo alone). The described "logos" may be displayed with the described avatars in a manner that suggests an association between a given avatar and a given logo (e.g., by displaying the logo on or near the avatar), thereby suggesting an affiliation between the given avatar (or user behind the avatar) and the entity represented by the given logo. An avatar displaying or brandishing a logo may be considered an "openly affiliated avatar" (i.e., openly affiliated with the entity represented by the logo).

Generally, an "entity" may be any organization, group, or platform that users may be associated with in some manner (e.g., as members, employees, students, subscribers, owners, executives, players, etc.). Example entities include schools; employers; unions; guilds; fantasy sports leagues, providers, or teams; owner groups or fan clubs (e.g., for popular vehicle makes or models); trade associations; professional organizations; etc.

Generally speaking, an "affiliation" may be any relationship between a user and entity that is recognized by the entity (or those associated with an entity) and that has been recorded such that the relationship is verifiable. For example, the affiliation may be recorded to memory using any suitable variable or field having a value that indicates the relationship. To illustrate, a variable may be unique to an entity-user pair, and may be binary (e.g., wherein "true" indicates an affiliation). In another example, the variable or field may be an integer or string specifying a level, rank, or type of relationship or affiliation. For example, an affiliation variable or field for a user-entity pair may have a value of: "student," "faculty," "administrator," "executive," etc. In some instances, access to a portion of a digital platform may be controlled or managed based on a user's affiliation with an entity. The access may be controlled or managed based, at least in part, on a degree to which the affiliation is authenticated.

Generally speaking, a "portion of a digital platform" may be an area of the digital platform, a virtual object displayed or provided on the digital platform, a function or operation enabled or provided by the digital platform (e.g., an avatar gesture or a function provided by another object on the platform), or any other suitable portion.

According to a further embodiment, while described sometimes herein as displaying a logo with an avatar, the term "avatar" may mean, or may include, an image of a real person displayed as such or displayed in a digitally altered manner, such that the logo is displayed in connection therewith. For example, in an augmented reality environment, the "avatar" may be a video in real time showing a real person, an actual user, but with a logo displayed as a badge on the video of the real person. According to this embodiment, the "avatar" may thus be a live feed of a real person being broadcast or otherwise transmitted on digital platform 300, with a logo applied to the real person's image or otherwise displayed proximate thereto or in association therewith. Such an embodiment may be implemented, for example, on an online user chat room or social media network. According to another embodiment, the avatar cannot be a real person or image thereof in an AR implementation or in chat room or social media network. Or, the real person may be visible, at least partially, in an OST (optical see-through) device using smart glass or using VST-video see-through (smart phone) interfaces. Such a person may be previously registered to the digital platform 300 and/or may be recognized using facial recognition or other technology. Authentication of the affiliation of the person may be requested to the digital platform 300 by a user wearing the OST or other user device. Upon authentication, the graphical indication of affiliation may be displayed on the OST or other user device.

FIG. 1 illustrates an example of an avatar 100 with a logo 102 in a display 104 generated by a digital platform. FIG. 1 illustrates that the user has selected or designed a female avatar of a particular appearance (sometimes known as a "skin") and that the avatar is wearing a badge with a NASA logo. Such an avatar 100 and logo 102 combination or pair may convey to other users of the virtual world that the user of the avatar is affiliated with this organization, NASA. Accordingly, other users may thus presume that the (user of the) avatar is knowledgeable about planetary exploration, space telescopes, or other issues connected to outer space. Other users may even assume that the avatar represents or speaks for NASA, or at least that the avatar speaks authoritatively about such matters.

Organizations may wish to control which users are entitled to control an avatar that displays a visual marking showing affiliation of the avatar with the organization, and also to control in which virtual worlds, and in which virtual spaces or contexts an avatar with such a logo 102 or other visible marking may enter. There may be times when an entity wishes to promote itself or to communicate with the public via digital platforms through avatars displaying visual markings of the entity, or at least to enable affiliated users to show off the company's brand on digital platforms. An entity may wish to control how avatars brandishing its logo may behave (e.g., by stipulating rules that must be followed by an avatar if it brandishes the logo). For example, entities may wish to control with which objects or other user avatars an openly affiliated avatar may interact. As another example, entities may wish to control the types of interactions an openly affiliated avatar may engage in. Specified negatively, such entities may wish to prohibit such a user's avatar (displaying the logo of affiliation with the entity) from interacting with some types of virtual objects, some other user avatars and some types of interactions. For example, there may be digital platforms, virtual spaces, virtual worlds, or virtual objects or avatars within virtual worlds or other digital platforms, that are associated with extreme political views, with racist, degrading, or violent slogans, images, or practices, with sexual or sexually explicit material, or with other material that an organization deems unbecoming or inappropriate for its image, trademark or brand, and may thus wish to make off limits for display of its logos.

The term "logo" may encompass a badge, button, shirt, cap, headband, keychain, ring or other jewelry, tattoo, accessory, and/or other type of design, color pattern or color sequence, checkered pattern, flag, photograph, image or visual indication, visual effect, for example, a visual effect using filters applied to an image, animation, audio displayed on, at or proximate the avatar, that conveys the notion or impression of an affiliation between the user of the avatar, and an entity, such as an organization external to the digital platform. In an embodiment, an avatar may have a previously designated place where a logo is to be placed. For example, such a place may be a spot on the chest to where a badge featuring the logo is to be "affixed" or a place on T-shirt where the logo is displayed. According to an aspect of the disclosure, the logo may be provided as just text, may include stylized text, and/or may include symbols or images indicating such affiliation with an entity. According to an aspect of the disclosure, the affiliation may be indicated by text, such as a name or corporate slogan, symbols, such as trademark logo, or an audio or video clip, or by a combination of the foregoing. The visual indication of affiliation may be provided as words that are displayed as a word bubble or the like at or near the avatar, or on a screen when the avatar is being displayed. In some embodiments, the logo or text indicating affiliation may be color coded or highlighted, so that it is of a similar color as the avatar displayed to indicate association with the avatar. Alternatively or additionally, the affiliation may be indicated visually by a combination of words and clothing, such as a uniform that the avatar is depicted as wearing, for example, an airline uniform or academic attire. In some cases, the user may decide where and how the logo is to be displayed, and may decide this for a session on the digital platform currently being accessed or for all sessions. For example, a user may decide the logo is to be displayed as a badge on the avatar, as a cap of the avatar, above the avatar, or as a combination of any of the foregoing display means. Or, a user may decide that on a first of the user's avatars the logo may be displayed as a T-shirt of the avatar with one color scheme, while on a second of the user's avatars the logo is to be displayed as a badge of the same or different color scheme.

While sometimes referred to as a logo, the indication of affiliation of an avatar may be or may include visual or graphic indication of affiliation. A graphic indication of affiliation may include a sound effect or musical clip associated with the entity, a specific choice of an announcer or another voice of a specific human being, such as a personality associated with the brand of the entity, or a combination of the foregoing. Visual indication of the affiliation proximate the avatar may mean that other users participating on the digital platform may be reasonably led to believe that the avatar of the user is affiliated with the entity indicated by the logo or other visual indication.

FIG. 2 illustrates the avatar 100 with the logo 102 (both also shown in FIG. 1) standing in a virtual space 202 of a display of a virtual world 200. A virtual wall 204 separates another virtual space (behind a virtual door 206 and the virtual wall 204) from the virtual space 202 of the virtual world 200. The other virtual space (not shown) may be the virtual site of activities or interactions that some entities deem unsuitable for association with their brands or that some entities restrict to affiliated users or some class of their affiliated users. Access to this other virtual space may be controlled as explained herein.

Figure 3:
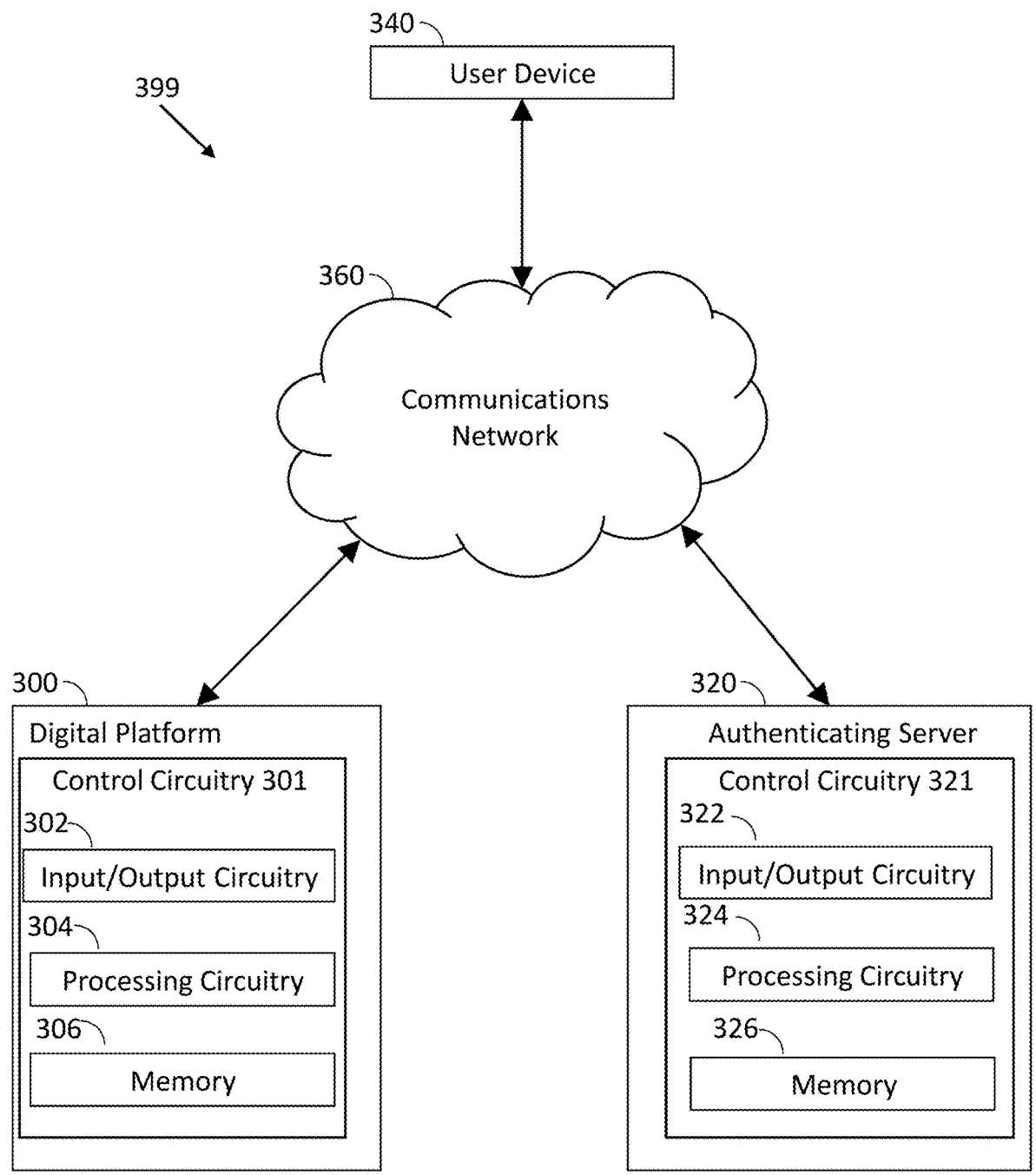
FIG. 3 is a schematic diagram showing an illustrative example of a digital platform, authenticating server and user device connected via a network, according to an aspect of the disclosure.

FIG. 3 illustrates a system 399 including a digital platform 300, which may be implemented by a server (a group of servers) in one or more locations, and may include an input/output (I/O) circuitry or module 302, a processing circuitry or module 304, and a memory 306. The I/O module 302 enables the digital platform 300 to communicate (via a network 360) with other nodes, including with a user device 340 and with authenticating server 320. The I/O circuitry 302 may be configured to enable wired or wireless communication by the digital platform 300.

The processing circuitry 304 may include any processor(s) or circuitry configured to implement the functions or operations described herein as being performed by the digital platform 300. The processing circuitry 304 may fetch and execute instructions stored to the memory 306. The memory 306 may be any component including computer-readable media (CRM) that is accessible for placing, keeping, or retrieving information (e.g., data, computer-readable, instructions, program modules, applications, routines, etc). Note, "CRM" refers to media that is non-transitory in nature, and does not refer to disembodied transitory signals, such as radio waves.

The network 360 may be any suitable network or group of networks. The network 360 is a collection of nodes (e.g., including the platform 300, the device 340, and the authenticating server) and links that are connected to enable telecommunication between the nodes. The network 360 may include dedicated routers, switches, or hubs responsible for forwarding directing traffic between nodes, and, optionally, dedicated devices responsible for configuring and managing the network. Nodes of the network 360 may be connected in a wired or wireless manner and may have different routing and transfer capabilities.

While depicted as a single server, the authenticating server 320 may be implemented as any desire number of servers (e.g., located in one or more locations). The user device 340 may be, or may include, a smartphone, laptop, desktop, tablet, game console, television, head mounted display, AR smart glasses, VR headset, or other type of communication device, or may be a combination of the foregoing. While one user device 340 is illustrated, appreciate that additional such user devices may be communicatively connected to the digital platform 300 at any one time (via wired or wireless connection) via the network 360. The user device 340 may receive content and data via an input/output path.

A user connecting via the user device 340 to the digital platform 300 may create an avatar on the digital platform 300, import an avatar to the digital platform 300, or may select from a menu of avatars available on the digital platform 300. Through an avatar, the user is represented on the digital platform 300. The digital platform may be a virtual world, such as Second Life™ or Meta™, or may be a virtual world that is oriented for a specific task or a type of activity, such as a virtual world used primarily for professional or commercial purposes, such as online virtual offices. The virtual world may include various types of scenes, virtual rooms or other spaces that an avatar can enter, and various types of virtual objects, virtual tools, and avatars of other users or of system administrators, and the like, with which an avatar can interact. The digital platform 300 may be a virtual convention or professional association meeting, a virtual office or other workplace, or a business meeting or the like, in which representatives or attendees are displayed as avatars. According to an aspect of the disclosure, the digital platform 300 may be an online social media network, in which members or participants are displayed as avatars. According to an embodiment, digital platform 300 may be an augmented reality platform or a virtual reality platform in which multiple users participate and in which real world objects and people, with life-like appearances or with computer-enhanced appearances, are intermixed with avatars and virtual objects.

The digital platform 300 may include software modules to simulate virtual objects of the virtual world as graphical or other representations (e.g., stored to the memory 306). The software may be operated on the digital platform 300 to generate those representations. The user device 340 may receive the displays generated by the digital platform 300. In this way, most video processing may be performed remotely by the digital platform 300 while the resulting displays are shown locally on the user device 340. In an embodiment, some or all of the video processing is performed at the user device 340. Digital platform 300 may receive inputs at the input/output circuitry 302 from the user device 340 via the network 304, and may transmit commands, for logging on, navigating the avatar, and the like, to the digital platform 300. Additionally or alternately, client software operating on the user device 340 may render on user device 340 (as graphical representations) graphical output according to messages and data structures, received from the digital platform 300, representing virtual objects. In such an embodiment, the user device 340 relieves the digital platform 300 of much processing. Accordingly, some functions of the digital platform 300 (e.g., rendering of visual display for aspects of a virtual world or other aspects of the digital platform, rendering of the avatar and/or the logo or other visual indication of affiliation, etc.) may be provided by one or more user devices. This distributed computing structure may allow for more powerful computational abilities, as the full computing power of user devices may be utilized to provide some or all server functions over the network. In this embodiment, some or all of the user devices may function as both clients and servers.

The digital platform 300 may maintain accounts for users. The accounts may include relevant data relating to users, such as usernames and logon credentials, avatars, authentication information for authenticated users; data for one or more logos or other visual affiliation information; and other personal information. Each user account maintained by the digital platform 300 may be associated with one or more avatars, which the user may select for appearing in a virtual world or in other applications.

The authenticating server 320 may maintain accounts for users affiliated with one or more entities, with each user account including relevant data relating to the user (e.g., data indicating user names and logon credentials; affiliation with an entity; status or rank with the entity; authenticated status of the user on a digital platform; one or more logos that are authorized for the user in connection with the entity; a unique ID that associates the user with such a logo; one or more avatars of the user that have been used by the user or that may be used by the user in connection with the logo; other authentication information for authenticated users, such as passwords; other data for one or more logos or other visual affiliation information that may be transmitted to the digital platform; any timeout information, including for how long a logo for a user is to be excluded from a portion of a digital platform; etc.). The processing circuitry 308 of digital platform 300 may also enable the user to customize an avatar by using various avatar customization suites, including avatar shape, gender, clothes, shoes, hairstyles, size, colors, tattoos, and the like for the avatar.

The processing circuitry 304 may be understood to include circuitry such as one or more microprocessors, microcontrollers, digital signal processors, programmable logic devices, field-programmable gate arrays (FPGAs), application specific integrated circuits (ASICs), etc., and may include a multi-core processor (e.g., dual-core, quad10 core, hexa-core, or any suitable number of cores) or mainframe computer. In some embodiments, processing circuitry 304 executes instructions encoded as hardware, firmware, software, or a combination of the foregoing. In some embodiments, processing circuitry 304 may be distributed across multiple separate processors or processing units, for example, multiple units of the same type of processing units or multiple units of different processors.

As noted, the nodes illustrated in FIG. 3 may communicate via any suitable number of networks. While the network 360 is depicted as a single network to avoid overcomplicating the figure, appreciate that the network 360 may represent multiple networks or sub-networks, depending on the embodiment. For example, the network(s) 360 may include one or more wide area networks (WANs) (e.g., the Internet, cellular networks, etc.), local area networks (LANs), personal area networks (PANs), etc. The network 360 may include any suitable number of wired (e.g., Ethernet) or wireless (e.g., Wi-Fi) links, networks, or sub-networks.

User device(s) 340 may include user computing devices, such as desktop computers, laptop computers, mobile computing devices, mobile phones and tablets, for example.

Additional devices and systems may be included in the system of FIG. 3. For example, the digital platforms 300 may communicate with common data stores, such as account databases, registration or authentication servers and management servers, for example. Such use of centralized systems may facilitate synchronization and coordination among digital platforms 300 or pieces of equipment that are part of a digital platform, for example, to coordinate avatar location transitions, to synchronize user accounts, and so on. The digital platform 300 may use the memory 306 to store data necessary for generating the environment provided by the digital platform, for example, a virtual word or augmented reality environment, and maintaining and providing services of the input/output circuitry 302 and the processing circuitry 304. The memory 306 may store URLs associated with entities, including lists of authenticating servers and lists of webpages associated with various entities at any single authenticating server, user credentials and other login information, user profiles, including avatars and logos associated with users, and IDs pairing users with affiliated entities, and associations between avatars and logos.

Turning to the authenticating server 320 shown in FIG. 3, the authenticating server 320 may include I/O circuitry 322, a processing circuitry 324, and a memory 326. The I/O circuitry 322 provides input and output circuitry to interface with digital platform 300 and with other devices via network 360. Tasks, including processing involving memory, described herein with regard to the authenticating server 320 may be performed, as described in connection with the digital platform 300, by one or more devices at one or more locations. For example, they may be distributed across multiple devices, as in cloud computing or distributed systems.

In an embodiment, each authenticating server 320 includes processing circuitry 324 and a memory 326. The authenticating server 320 may include the processing circuitry 324, which may determine affiliation of users with entities, status or rank of a user in an entity, digital platform access policies associated with entities, identifications associating authenticated users with entities, information regarding acceptable logos and acceptable avatars, and the like. The authenticating server 320 may use the memory 326 to store data necessary for maintaining and providing services of the input/output circuitry 322 and the processing circuitry 324. The memory 326 may store lists of users affiliated with various entities, including status and rank information of users at affiliated entities, logos used by entities that are available to users, including various logo designs depending on user status and rank at entities and depending on digital platform, digital platforms that are acceptable or unacceptable to entities, and IDs pairing authenticated users with affiliated entities, and associations between avatars and logos.

Figure 4:
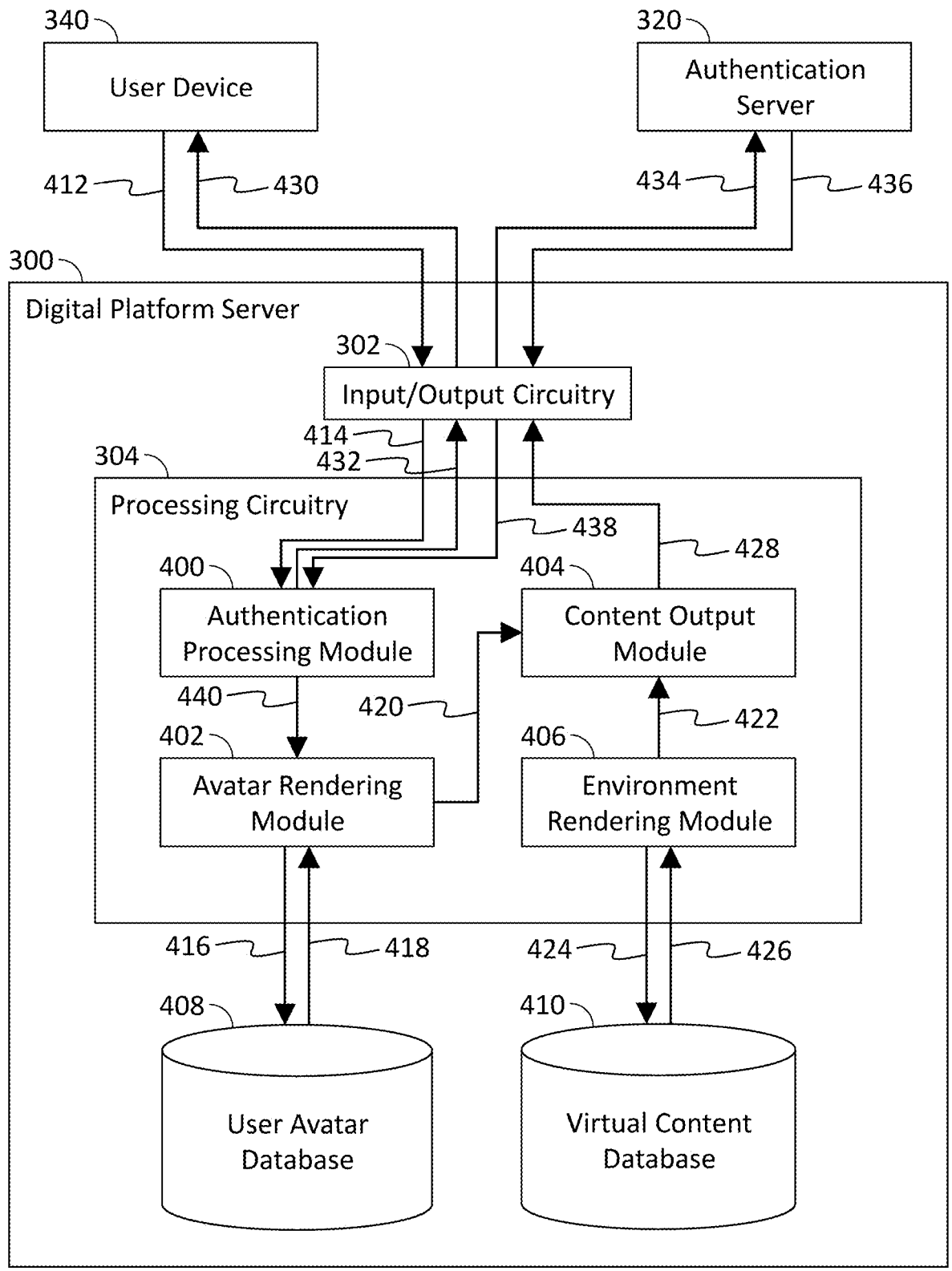
FIG. 4 is a schematic diagram showing an illustrative example of components of the digital platform, authenticating server and user device communicating with each other via a network, according to an aspect of the disclosure.

FIG. 4 illustrates components of the digital platform 300 communicating with the user device 340 and the authentication server 320 via communications paths 412, 430, 434, and 436, (each of which represents underlying logical links, physical links, or intermediary nodes that communicatively connect the relevant nodes). The digital platform 300 may include input/output circuitry 302 and processing circuitry 304, which may include authentication processing module 400, avatar rendering module 402, content output module 404, and environment rendering module 406. The digital platform 300 may include a user avatar database 408 that stores avatars associated with users of the digital platform 300 and virtual content database 410, which provides data for environment rendering module 406 and other components of the system for providing the digital platform, such as a virtual world.

According to an aspect of the disclosure, the user device 340 may connect through communication path 412 with the digital platform 300 via the input/output circuitry 302. In particular, the user device 340 may request authentication of a user, and thus use of the user's avatar, on the digital platform server 300 displayed in association with a logo (e.g., logo 102) of an entity with which the user alleges affiliation. The input/output circuitry 302 may, in turn, transmit 414 the user request to the processing circuitry 308, where it is received using authentication processing module 400. The user request may cause avatar rendering module 402 to render an avatar (e.g., avatar 100). One or more such avatars for a user may be stored in user avatar database 408, to which avatar rendering module 402 communicates via communication path 416 and from which avatar rendering module 402 receives data via communication path 418. Avatar rendering module 402 also communicates, via communication path 420, with content output module 404 and provides content output module 404 with the rendered avatar.

Content output module 404 also receives, via communication path 422, rendered virtual world content from environment rendering module 406 which provides other aspects of the digital space provided by digital platform server 300. Environment rendering module 406 transmits a request, via communication path 424, to virtual content database 410 for data describing the environment of the virtual world for the current location of the user within the virtual world. The environment rendering module 406 receives the requested data via communication path 426 and renders the data as a 2D or 3D representation of the virtual world, depending on the type of user device (e.g., an AR or VR display). Content output module 404 combines the rendered avatar and rendered environment into a single data stream and transmits the stream, via communication path 428, to the input/output circuitry 302 which in turn transmits the stream, via communication path 430, to user device 340.

The digital platform server 300 communicates via the input/output circuitry 302 with the authentication server 320. In particular, the digital platform 300 may transmit authentication requests by communication path 432 to input/output circuitry 302, which in turn transmits the requests by communication path 434 to authentication server 320. The digital platform server 300 may receive IDs pairing an entity with a user, pairing a logo of the entity with a user, or the ID may associate an entity and/or logo of the entity with the user and with one or more avatars of the user. The digital platform 300 via the input/output circuitry 302 may also receive authentication confirmations, and other communication via communication path 436 from the authentication server 320. The input/output circuitry 302 may transmit and receive via communication path 438 to the authentication processing module 400. If the user is authenticated by the authentication server 320, the authentication module 400 transmits, via communication path 440, the logo or other indication of authentication to avatar rendering module 402. Avatar rendering module 402 may then incorporate the logo or other indication into the user avatar during rendering.

After system start, a user may log on to the digital platform (e.g., a digital platform run by digital platform server 300). For example, user device may be rendered a webpage prompting input of username, password, and/or other credentials of the user. The user may then select an avatar that he or she wishes to use. In some embodiments, an avatar is assigned to the user by the digital platform. Avatars may be customizable, and the user may design an avatar or a portion thereof. The avatar may have been selected in a previous user session in this or another digital platform.

Figure 5:
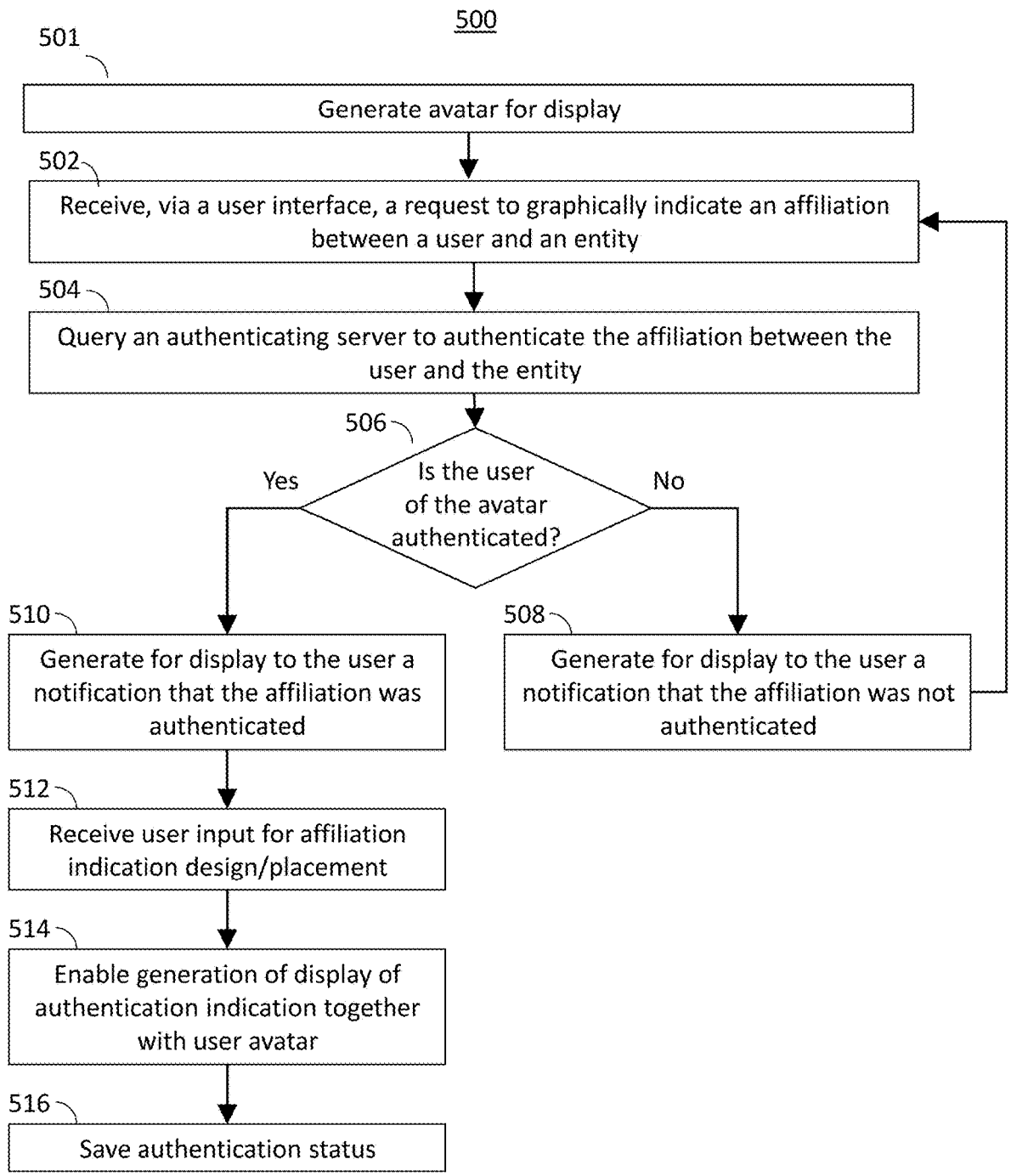
FIG. 5 is a flowchart illustrating an example of a process for user affiliation authentication, according to an aspect of the disclosure.

FIG. 5 is a process flow diagram illustrating an example method 500 to authenticate a user affiliation with an entity. Advantageously, the method 500 may be implemented to address a user's wish to display an affiliation of the user with the entity. The method 500 may be implemented, in whole or in part, by the systems and components described herein (e.g., the system 399 shown in FIG. 3). One or more instructions or routines for implementing the method 500 may be stored to one or more memories of the system 399; these instructions or routines may be executed to implement the method 500.

At 502, the user may request or select a logo of an entity with which the user alleges affiliation. For example, the user may wish to don a badge (e.g., badge 102 on avatar 100) that appears to claim or to imply that the avatar's user is affiliated with an outside entity, such as a well-known organization, for example, on clothing worn by their avatar 100. An affiliation may entail an association with an organization, state, partnership, guild, league, association or other entity, and the nature of the affiliation may be employee, contractor, partner, affiliate, member, executive, board member, participant, or a former one of these categories, or a combination of the foregoing.

At 504, the digital platform 300 queries the authenticating server 320 to authenticate the affiliation between the user and the entity. For example, the digital platform 300 transmits an authentication request for a user to authenticating server 320. The digital platform 300 may use a lookup table stored in the memory 306 to interact with an appropriate authenticating server (e.g., authenticating server 320) related to the entity to which the user alleges affiliation. For example, user may be prompted to enter the name or other identifying information for an entity to which the user claims affiliation. In some instances, user may enter a URL or other identifying information for the authenticating server 320. The query requesting affiliation authentication at 504 may be sent in response to receiving a user request for authentication of affiliation with an identified entity with which the user alleges affiliation.

The authenticating server 320 may be affiliated with the external entity, or may be a central authenticating server serving multiple parties that may enroll in such an authenticating service by the authenticating server 320. According to an aspect of the disclosure, the authenticating server 320 may be affiliated with the digital platform. For example, one or more digital platforms 300 may be associated with, or may be provided as part of, the authenticating server 320 or an authenticating server system. The authenticating server 320 may serve a number of entities to allow multiple entities to use it as their authenticating server 320.

The user affiliation authentication request may include identifying information for the user associated with the avatar. The user information may be previously stored by the digital platform 300 as part of a profile for each user, or may be requested in real time from the user device 340. The digital platform 300 may store in the memory 306 user information describing the user, for example, a school or a workplace of the user that is sufficient to determine the identity of the authenticating server 320 to be contacted to authenticate the user. The memory 306 may be an electronic storage device for storing electronic data, computer software, or firmware, such as random-access memory, read-only memory, hard drives, optical drives, solid state devices, quantum storage devices, or any other suitable fixed or removable storage devices, and/or any combination of the same. Nonvolatile memory may also be used (e.g., to launch a boot-up routine and other instructions). Cloud-based storage may be used to supplement memory 306, or instead of local memory.

The affiliation authentication request may contain an image of an avatar, or identifying information for the avatar, that the authenticating server 320 may assess for suitability. For example, some entities may restrict the types of avatars for which logos are to be displayed. Some avatars may be deemed to be inconsistent with the image or brand of an entity (thus some avatars may be blacklisted for a logo), or a certain list or a certain type of avatar may be deemed to be acceptable to an entity, and thus such avatars may be whitelisted-deemed suitable for use and display with the entity's logo to the exclusion of other avatars. According to an aspect of the disclosure, a user may designate more than one avatar as part of the user affiliation authentication request to be approved by the authenticating server 320.

In some instances, digital platform 300 may request from the user device 340 information sufficient to find the appropriate the authenticating server 320. For example, the user device 340 may receive from the user a URL or the name of an organization, such as a school or workplace that the user claims to be affiliated with. The user affiliation authentication request transmitted to the authenticating server 320 may include the user's name and or Social Security number, birthday, employee ID, member ID, year or date of graduation or anniversary, and/or other such identifying information. The user affiliation authentication request may also include an e-mail address and/or password that the user has been assigned by the entity with which the user claims to be affiliated.

If desired, an entity may provide a linear or matrix bar code, or UPC (universal product code), that a user can scan to verify affiliation. The digital platform 300 may then prompt the user to enter the bar code information, for example, by uploading a photograph of the barcode. Such user identifying information may be stored for the user in advance by the digital platform 300 or may be requested in real time by the digital platform 300 from the user. In an embodiment, upon receiving a request to use a logo with a user avatar, the digital platform 300 may prompt the user to enter a URL or other indication of a source for authentication, and may re-direct communications of the user device 340 to the target source for logo retrieval upon affiliation authentication.

Accordingly, the digital platform 300 may then await confirmation of affiliation authentication from the authenticating server 320 together with, or in the form of, a logo that then could be displayed with the avatar. Based on this user affiliation authentication request, the authenticating server 320 may search its memory 326 for any record of such user.

At 506, the digital platform 300 may determine whether the user avatar is authenticated. The authenticating server 320 may determine whether to authenticate the user affiliation, as described herein in connection with FIG. 10. For example, the authenticating server 320 may determine that the user is indeed affiliated with the entity, for example, that user is an employee or member of the entity with which the user claims to be affiliated, and the authentication approval is communicated to the digital platform 300. Then the digital platform 300 may receive notification of whether the user of the avatar is authenticated. The digital platform 300 may then process a response to the authentication query from the authenticating server 320. The reply may indicate authentication and may include a user-logo confirmation. In an embodiment, to determine authentication, the digital server 300 may check the memory 306 to determine whether this user has previously been authenticated for this entity. For example, a user profile stored in the memory 306 may contain an ID that pairs user with an affiliated entity, or pairs user with a logo of the affiliated entity. If so, or if the authentication occurred within a recent period of time, for example, within the past hour, this may obviate the need to query the authentication server 320 to request authentication. However, according to an aspect of the disclosure, the authentication server 320 may still be queried to confirm that the user is still authenticated for the logo at the present time.

At 508, in response to determining that the user of the avatar is not authenticated ("No" at 506), the digital platform 300 may generate for display to the user a notification that the affiliation was not authenticated, and processing returns to 502. Thus, digital platform 300 may generate a message to be transmitted to user device 340. The message may include text to be displayed to the user in a notification area or popup. In some embodiments the message may include a flag or Boolean value that is interpreted by the user device 340 as an indication that the affiliation was not authenticated.

At 510, if the user is authenticated ("Yes" at 506), then the digital platform 300 may generate for display to the user a notification that the affiliation was authenticated. The notification generated by the digital platform 300 may be a message caused to be transmitted to the user device 340. The message may include text to be displayed to the user in a notification area or popup. In an embodiment, the message may include a flag or Boolean value that is interpreted by the user device 340 as an indication that the affiliation was not authenticated. The user device 340 then displays an appropriate notification based on the interpreted indication.

According to an embodiment, the user may upload a logo, design a logo, select a logo available on the digital platform, or may customize an available logo, according to the user's own preferences. The user may design the logo or may obtain the logo from the user's organization or from the authenticating server 320, or from the digital platform, after or before the logo is authenticated for display with the avatar on the digital platform.

At 512, user input may be received (e.g., via the user device 340) regarding a design or placement for a logo indicating affiliation. The logo selection may take place after the user affiliation is authenticated, as shown at 512. For example, the digital platform 300 may store a number of commonly used logos from which users may select, subject to authentication. As another example, upon request of authentication of affiliation and confirmation of affiliation, the authenticating server 320 may transmit to the digital platform 300 one or more logo designs from which the user may select or which the user may customize.

Note that, although only one authenticating server 320 is illustrated in the drawings to keep the drawings uncluttered, the digital platform 300 may interact with numerous such authenticating servers, each authenticating server being affiliated or operated by a respective party to which user may allege affiliation. If desired, the digital platform 300 may store in advance such available logo selections associated with frequently used entities for user to choose from. The user may select one of several authenticated logos or appearances for the avatar. For example, after the user affiliation is authenticated at 506, the digital platform or the user may be enabled to select an airline captain's uniform or a badge indicating affiliation with the airline, or both the uniform and the badge. According to an aspect of the disclosure, a standard logo is assigned by, or according to the specification of the authenticating server, regardless of user preference.

According to an aspect of the disclosure, the digital platform 300 automatically checks whether the user is affiliated with a known entity, without prompting or requesting by the user, for each user that joins the digital platform 300 as a member, subscriber or user of the system. Alternatively or additionally, the digital platform 300 may check affiliation, when a user connects for a session on the digital platform 300. For example, the digital platform 300 may retrieve user profile data for previous affiliation authentication on the digital platform 300, or may search a database at or external to the digital platform 300, for such user affiliation confirmation information. According to an aspect of the disclosure, in the absence of authenticated affiliation information for the user, digital platform 300 may, at 508, automatically request authentication of the affiliation of the user by the authenticating server 320. For example, digital platform 300 may, when the user first joins as a member or subscriber of the digital platform 300, or when a user logs on for a session, automatically search the user profile for possible user affiliation, for example, by searching user information regarding workplace, school, membership or the like of user. Upon finding such information in the user profile, digital platform may automatically query the user whether the user wishes to request authentication of affiliation with the relevant entity. According to an aspect of the disclosure, upon finding such information in the user profile, digital platform may automatically transmit an authentication request to a relevant authentication server, and upon authentication, give the user the choice as to whether the user wishes to display the entity's logo or other indication of affiliation.

The digital platform 300 requests user affiliation authentication from the authenticating server 320 via the network 360, such as the Internet. Such authentication may take place before the digital platform enables visual indication of an affiliation of the user with the entity in relation to the user's avatar.

According to an embodiment, the authenticating server 320 may differentiate the logo or other visual indication of affiliation to be displayed, according the digital platform 300 on which display is requested. For example, a digital platform commonly associated with recreational use may be assigned a logo, or a class of logos, different from a second logo, or class of logos assigned for a digital platform commonly used for business or professional purposes, even for the same affiliated entity. For example, a logo design for the former may be less formal or more stray from a standard trademarked logo of the affiliated entity. Thus, the same user may be assigned different logos for the same entity depending on which digital platform 300 the user's avatars are displayed on.

At 514, the digital platform 300 enables generation of display of a logo (e.g., logo 102) on, proximate to, or in conjunction with avatar 100 of the digital platform display 104. The processing circuitry/module 304 may instruct input/output circuitry 302 to generate display of avatar 100 and logo 102 on the user device 340. At 516, authentication status for the user and/or the avatar 100 may be saved in the memory 306 of the digital platform 300.

Figure 6:
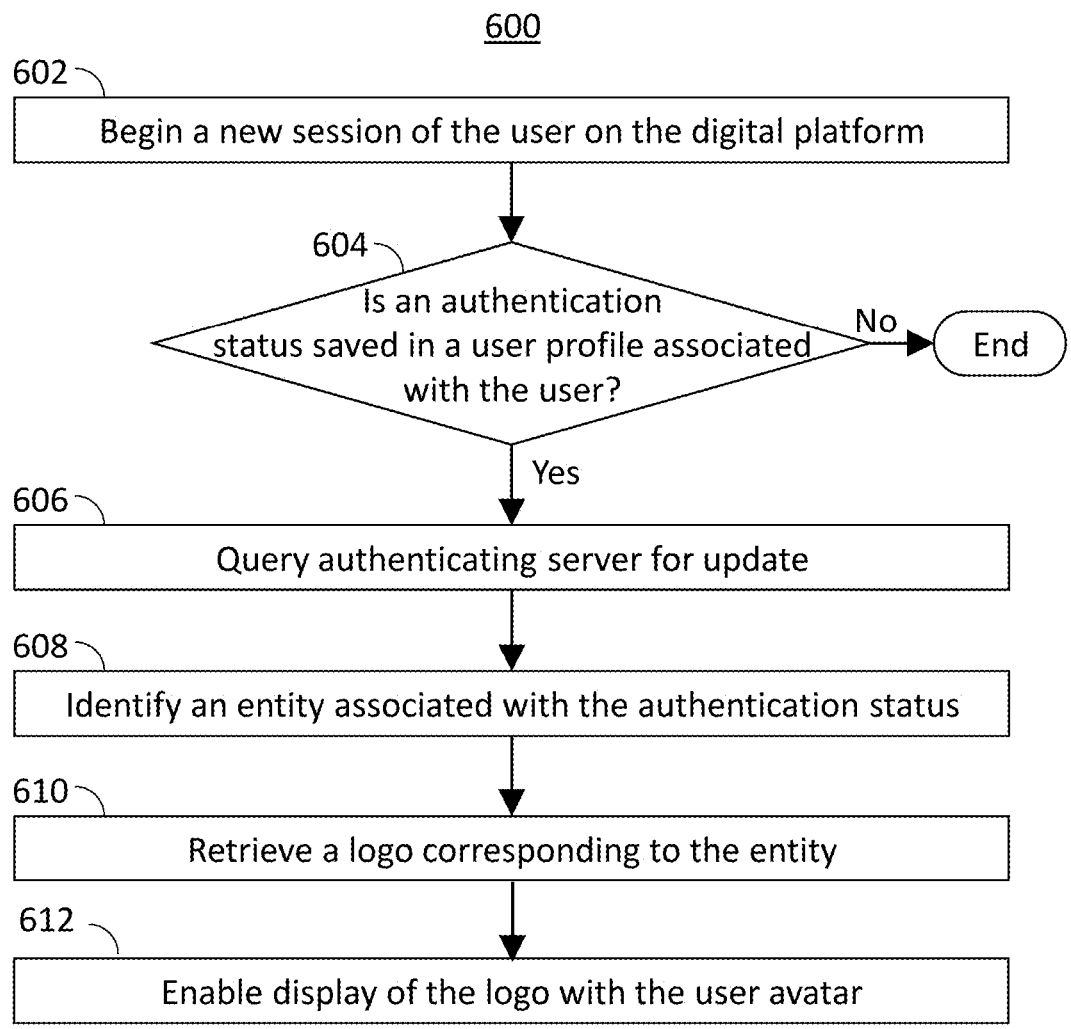
FIG. 6 is a flowchart illustrating an example of a process for enabling display of a logo with user avatar for a previously authenticated user.

According to an aspect of the disclosure, if the logo of an affiliated party has been previously authenticated for the user, then in one or more further user sessions digital platform may automatically attempt the authentication without further user input, as illustrated in FIG. 6. At 602, the user may begin a new session on the digital platform 300.

At 604, digital platform 300 determines whether an authentication status has been previously saved for the user, for example as part of user profile associated with the user. In some instances, the digital platform 300 may request confirmation from authenticating server 320 that the authentication status for the logo in connection with the user has not changed. In some embodiments, the digital platform 300 may automatically query the authenticating server 320 again to authenticate the user affiliation. If the authentication status is not saved in user profile ("No" at 604), then the process ends.

If an authentication status is saved in the user profile ("Yes" at 604), then, at 606, the authenticating server 320 may be queried for an update of the authenticating status. Affiliation of the user with the entity may have been terminated or lapsed since the last time the authenticating server 320 authenticated the affiliation.

According to an aspect of the disclosure, the digital platform 300 may periodically request affiliation update information about users from one or more the authenticating servers 320 so that the digital platform 300 may determine whether continued automatic display of such a logo or other visual indication is warranted for a user avatar. That is, the digital platform 300 may have a list of authenticating servers with which its users are affiliated, and may, at set periods, or at each user sign-in to the digital platform 300, request updated affiliation information for its users from these authenticating servers 320. Or, such updating may be pushed, that is, the authenticating servers 320 may automatically submit to the digital platform 300 updating information about affiliated users. Such push updates may be transmitted periodically or in the event of a change in affiliation status, for example, when a user has left the company. Such updating information about users may indicate a positive affiliation with affiliated entities.

At 608, the affiliated entity with authentication status may be identified. For example, a numerical or alphanumerical ID associating the user with an entity may be saved in user profile, and at 604 the answer would be "yes." Thus, the identity of the entity may then be determined at 608 based on the numerical or alphanumerical ID. At 610, the logo corresponding to the entity may be retrieved in accordance with the identification of the entity. For example, one or more logos may be stored for a given entity to be displayed for avatars of a user, or class of users, of the digital platform 300. At 612, display of the logo with the user avatar is enabled. This may be accomplished using methods described above in connection with FIG. 5.

Figure 7:
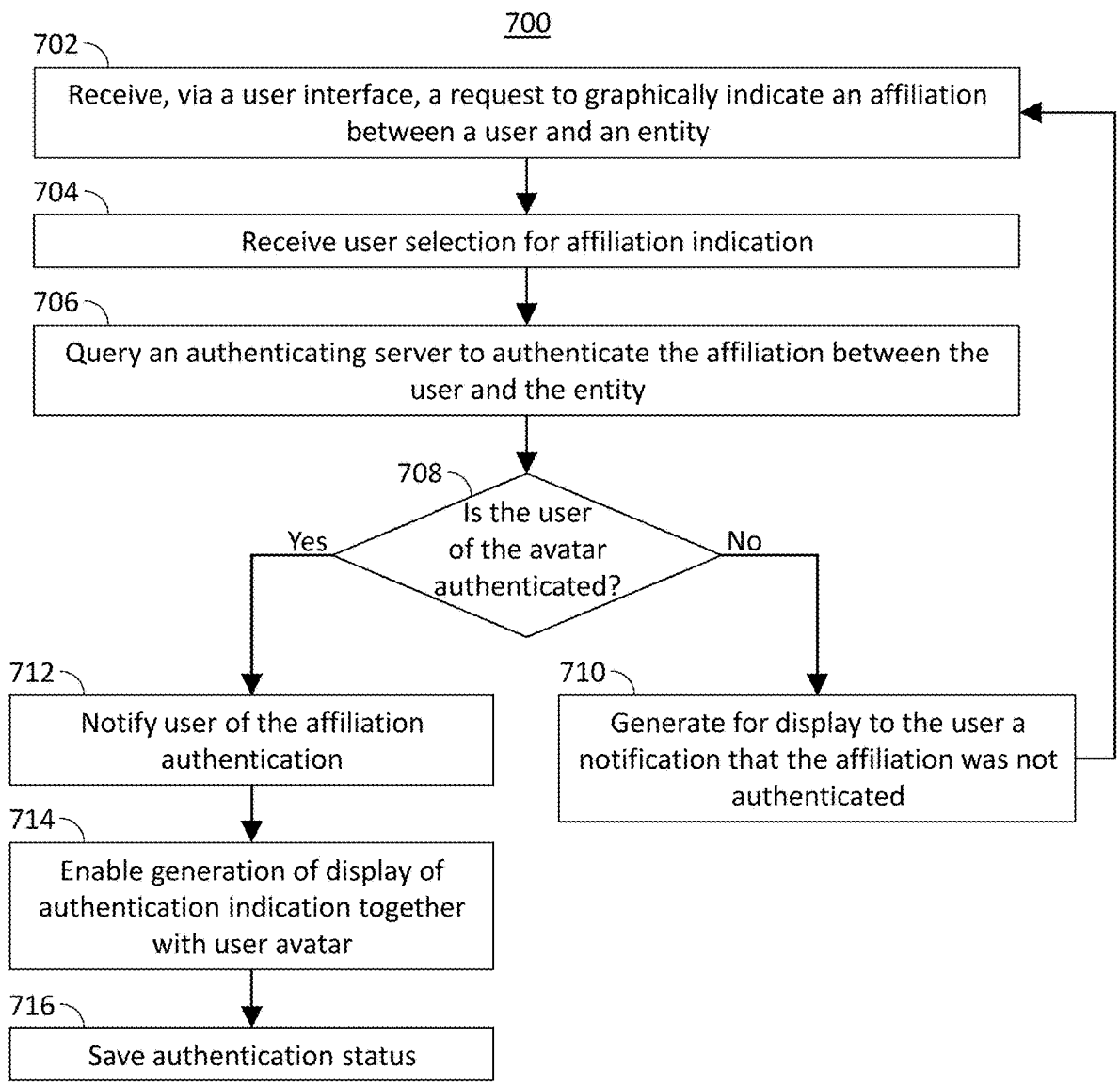
FIG. 7 is a flowchart illustrating an example of a process for user affiliation authentication in which user may select a logo before authentication, according to an aspect of the disclosure.

FIG. 7 illustrates an authentication process in which the user first selects an affiliated entity and/or a logo connected to the affiliation.

At 702, the digital platform 300 may receive a user request to display, or graphically indicate, an affiliation between the user and an entity. The user may indicate a specific entity with which the user alleges affiliation. For example, the user may select from a list of affiliated entities commonly used on the platform or may be prompted to enter a name of an affiliated entity. This may also be accomplished using methods described above in connection with FIG. 5.

At 704, the digital platform 300 receives a user selection for affiliation indication. For example, the user may select or upload a logo or other affiliation indication connected to the affiliated entity. In some embodiments, the user may upload a photo of a logo that the user was provided by the user's employer or other affiliated entity, or user may scan or otherwise provide a barcode that the digital platform 300 uses to generate the logo. For example, based on the bar code, the digital platform 300 may retrieve a logo from an entity server or from the authenticating server 320.

At 706, digital platform may request the authenticating server 320 to authenticate the affiliation between the user and the entity. This may be accomplished using methods described above in connection with FIG. 5.

At 708, the digital platform 300 determines whether the user of the avatar is to be authenticated, as described above with respect to FIG. 5.

At 710, if the user is not authenticated ("No" at 708), the digital platform 300 generates for display to the user a notification that the affiliation was not authenticated, which may be accomplished using methods described above in connection with FIG. 5, and processing returns to 702.

At 712, if the user is authenticated ("Yes" at 708), the digital platform 300 generates for display to the user a notification that the affiliation was authenticated. This may be accomplished using methods described above in connection with FIG. 5.

At 714, the digital platform 300 enables generation or generates display of the authentication indication together with user avatar. If desired, the user may then select the avatar with which the logo is to be affiliated.

At 716, the digital platform 300 may save the authentication status for further sessions of the user. For example, the digital platform 300 may store the authentication status in a user profile associated with the user, which may be accessed by the digital platform 300 whenever the user accesses or logs into the digital platform 300. The authentication status may be saved as a Boolean flag together with data linking to the image of the logo or set of logos or may be an ID pairing the user with the logo or a set of IDs pairing users with logos.

Figure 8:
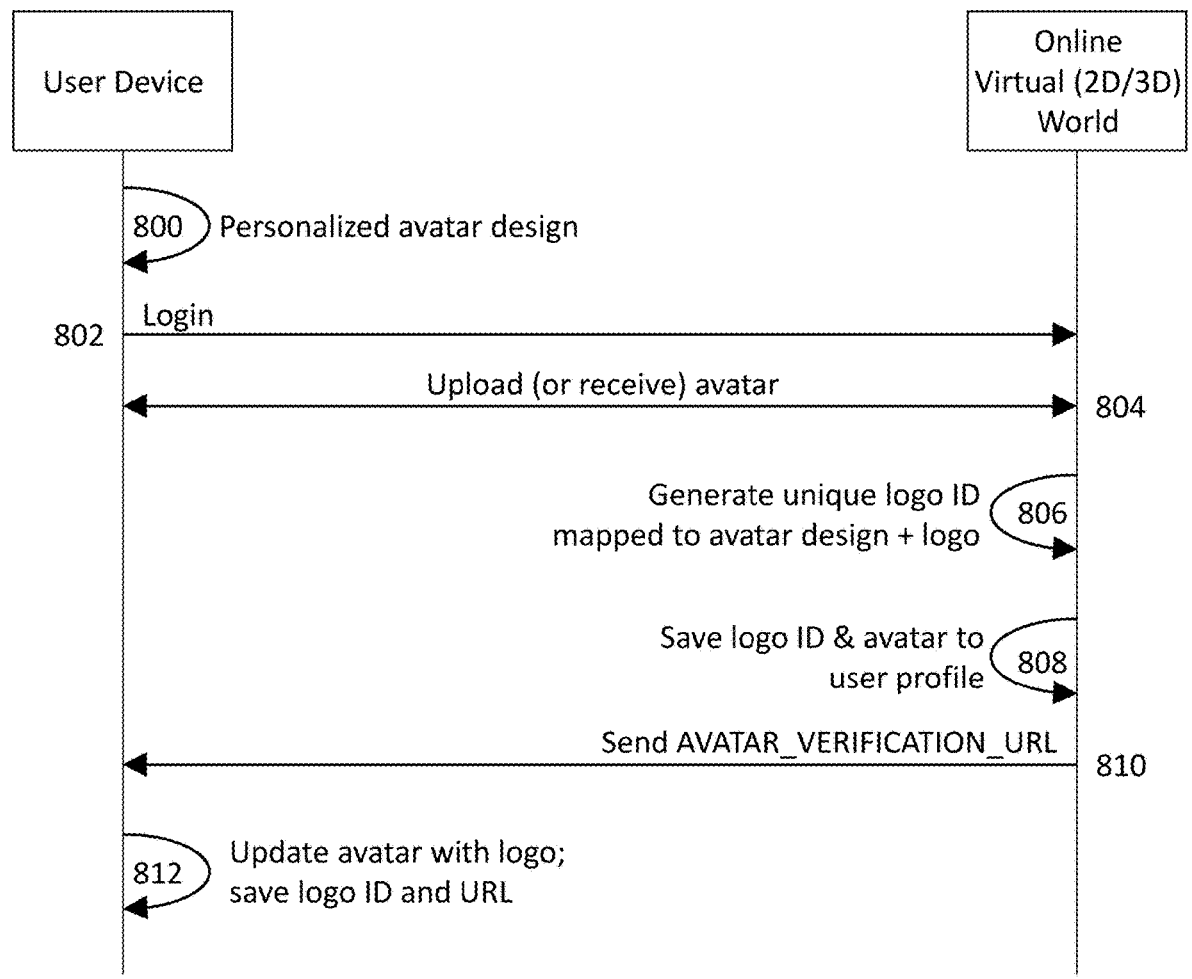
FIG. 8 is a communication/process flow diagram for affiliation authentication of a user, according to an aspect of the disclosure.

FIG. 8 is a communication flow/process diagram between the user device 340 and the digital platform 300, according to an aspect of the disclosure.

At 800 the user may design a personalized avatar or customize an avatar design, as described above.

At 802, user may log in to the digital platform 300. It will be understood that the avatar design/customization may take place after this step.

At 804 the user may upload the designed avatar or may receive the avatar from the digital platform 300.

At 806, the digital platform 300 may create a unique logo ID associating the avatar with a logo of an entity affiliated with the user. For example, the digital platform 300 may query the user device 320 for current login parameters to determine other servers to which the user device has been logged in. If based on the response from the user service 320, the digital platform 300 confirms that the user device is logged into an account of the entity or to an appropriate webpage of authenticating server 320, then digital platform 300 may assign a logo to the user avatar or may authenticate the logo uploaded by user.

At 808, the ID linking the logo with the user, and possibly linking the logo, user and the avatar, may be saved by the digital platform 300 in a user profile associated with this user in the memory 306 of the digital platform 300.

At 810, the digital platform 300 may send the logo together with a confirmation that enables user device 342 to use the avatar together with the logo in this and future sessions on digital platform 300. The confirmation may contain a URL to a webpage of the digital platform 300. Access to this webpage of the digital platform 300 may enable use of the avatar with the logo by the user.

At 812, user device 340 updates the avatar with the logo as well as the saved logo ID and URL. The URL may point to the address of the authenticating server 320.

According to an aspect of the disclosure, the authenticating server 320 checks whether the user has already been authenticated in connection with the logo for a particular digital platform before authenticating the user. That is, the authenticating server 320 may "check out" the logo for a given user only once for a given session, or for a given period of time, and then determine that any further authentication request for the user is coming from an imposter. In example operation, the authenticating server 320 may allow a logo to be checked out only once for a given session on a first platform, but may allow the logo to simultaneously be checked for a second session on a second platform. The authenticating server 320 may ascertain whether the user has been authenticated for the logo in the current user session with the digital platform 300, or may search its memory 326 for a previous instance within a certain timeframe of the logo having been checked out for this user.

Figure 9:
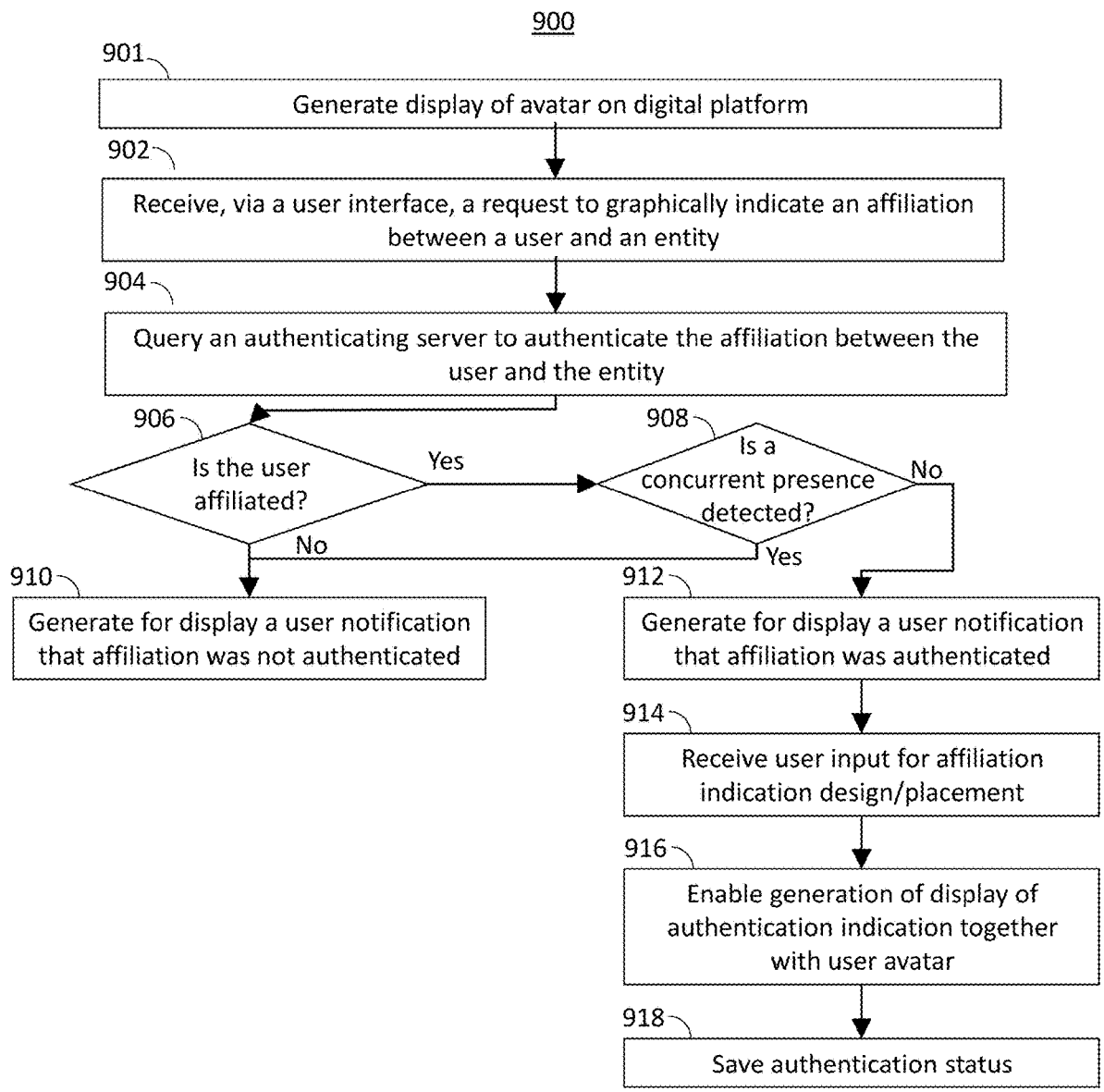
FIG. 9 is a flowchart illustrating an example of a process for user affiliation authentication with concurrent presence detection, according to an aspect of the disclosure.

FIG. 9 is a flowchart illustrating an example of a method 900 for user affiliation authentication with concurrent presence detection, according to an aspect of the disclosure. By implementing the method 900, the described systems can infer that an account associated with an avatar may have been compromised based on a detection of multiple users claiming to be the same user or avatar with the same logo representing the same affiliation. Based on this inference, the described systems can reject a request for authentication.

According to such an approach, at 902, the digital platform 300 receives, via a user interface, a request to graphically indicate an affiliation between a user and an entity. This may be accomplished using methods described above in connection with FIGS. 5 and 7.

At 904, the digital platform 300 queries the authenticating server 320 to verify the affiliation between the user and the entity. The authenticating server 320 may determine whether the user is affiliated with the entity, and may also determine whether there is a concurrent presence of the user. For example, if the user has been previously authenticated, for example, then the authenticating server 320 may check the memory 326 whether a unique ID associates the user with the affiliated entity. In some embodiments, a logo or other indication of affiliation may be "checked out" to a user only once per session. Thus, to determine whether a concurrent presence has been detected, the authenticating server 320 may query the digital platform 300 and/or other digital platforms to determine whether the logo is checked out for the user. The authenticating server 320 then transmits both the authentication response and the concurrent presence result to the digital platform 300.

At 906, the digital platform 300 determines whether the user is affiliated with the entity. For example, digital platform 300 processes the response from the authenticating server 320 to identify an indication of whether the user is affiliated with the entity.

At 908, if the user is affiliated with the entity ("Yes" at 906), then at 908, digital platform 300 further determines whether a concurrent presence of the affiliated user is detected. The digital platform 300 processes the response from the authenticating server 320 to determine whether a concurrent presence was detected. A concurrent presence is an issue because it may indicate that a user's identity is being used by someone else. That is, a user's affiliation with an entity is authenticated and a graphical indication of the affiliation is displayed at or simultaneously with the user's avatar. Then a request for authentication of the same user's affiliation with the entity is received again while the graphical indication of affiliation for the user is still displayed on the digital platform 300. This may mean that multiple users of the digital platform are claiming to be the same user affiliated with the entity. The second request for authentication may be rejected.

At 910, if a concurrent present was detected ("Yes" at 908), or if the user is not affiliated with the entity ("No" at 906), digital platform 300 may generate for display user notification that the affiliation is not authenticated. An explanation of the concurrent presence, including an identification of the date/time of the earlier instance of authentication of affiliation may also be provided.

At 912, if no concurrent presence has been detected and the logo has not been checked out ("No" at 908), the digital platform 300 generates for display a user notification that affiliation was authenticated. In an embodiment, the digital platform 300 notifies the authenticating server 320 when a user with a user-logo pairing ends a session, so that the authenticating server 320 may check back in the logo credential. Accordingly, the authenticating server 320 may then allow the user to check out the logo again for another session on the digital platform 300 or on other digital platforms.

At 914, the digital platform 300 may receive user input for logo placement. For example, the user may be prompted to select one of different logo types or to provide input into the design of the logo. The user may also be enabled to direct a place where on the avatar the logo is to be placed, on or near the avatar, and/or to select a type of logo the user wishes, for example, a badge style logo, a logo in a center of a cap or T-shirt, a uniform, or the like.

According to the user indication of design and placement, at 916, generation of the display of the authentication indication is enabled together with the user avatar.

At 918 the authentication status is saved. Additional logo information, such as the user input for design and/or placement received at 914, may also be saved.

While only one digital platform 300 is illustrated in the drawings to keep the drawings uncluttered, many such digital platforms may be provided. According to an aspect of the disclosure, upon receipt of an indication that no concurrent user exists on the digital platform 300, the authenticating server 320 may also determine whether the logo for this user has been "checked out" by another digital platform. That is, the authenticating server 320 may look up in its memory 326 whether on other digital platforms on which the authenticating server 320 has previously at any time authenticated this user the logo is checked out, or the authenticating server 320 may query known digital platforms to determine whether the user is already in session with another digital platform. The authenticating server 320 may maintain a list of digital platforms on which this user has been previously authenticated, or for which authentication for this user has previously been requested, and may query each of these digital platforms for current "checkout" of the affiliated logo for this user. Accordingly, it may determine that the user for whom authentication is currently being requested cannot be the genuine user wishing to be authenticated on digital platform 300 since the logo-user ID has been checked out on the other platform. Thus, concurrent use of the affiliation logo by this user may be determined, as a precondition for authentication of the user in response to the user affiliation request.

According to an aspect of the disclosure, the authenticating server 320 may further determine a rank or a title of the user that entitles the user to have a corresponding rank be displayed with the user's avatar. For example, the authenticating server 320 may determine that the user is indeed affiliated with the entity and has a particular rank or status in the entity. By way of illustration, the entity may be a university, and the status of the user may be a professor, and thus the authenticating server may authenticate the user not merely as a student or other person affiliated with the university. In such a case, the authenticating server 320 may transmit authentication for the user as being affiliated at a certain rank or title, namely as faculty member, or in particular, for example, as an adjunct faculty member. The rank or title may then govern the type of logo or other visual indication of affiliation that may be displayed in connection with the avatar. All these status, title or rank identifiers of a user may be referred to herein as rank. For example, if the user is authenticated as being a captain with the airline, then the avatar could be the depicted on the digital platform as wearing a captain's hat as part of the airline uniform. On the other hand, if the user is authenticated as being an employee of the airline other than a captain, then affiliation with the organization would be authenticated and a logo would be displayed for the avatar, but the captain's rank would not be indicated for the avatar. A corresponding captain's logo for the airline may then be transmitted by the authenticating server 320 to the digital platform 300 and uniquely paired with the user or may be uniquely associated with the user and one or more avatars of the user. Alternatively or additionally, digital platform 300 may, in advance, store a range of types of logos, depending on status, for each entity. An appropriate logo may then be identified by the authenticating server 320 in the user-logo confirmation transmitted to the digital platform 300 to be displayed with the avatar as the logo. The digital platform 300 may enhance a user's rank with the user's history and with the user's accrual of interactions on the digital platform 300 as recorded by the digital platform 300. With additional interactions and use on the digital platform 300, the platform 300 may increase the rank of the user.

According to an embodiment, the logo of more than one affiliated entity may be displayed simultaneously with the same user avatar. A separate authentication process may be necessary for each affiliation to enable display of a respective logo or other affiliation indication. If desired, the digital platform 300 may restrict each user, or restrict some of the users of the digital platform 300, to a single avatar in connection with any one logo. Or, the authenticating server 320 may authenticate a logo for a user, or may authenticate a logo for a single user avatar, only if no other entity's logo has been authenticated for that user or for that user avatar.

Since other users may come to associate a particular user avatar with an affiliated entity regardless of whether the logo is displayed with the avatar at any given time, the digital platform 300, or the authenticating server 320, may require that the avatar, once associated with a logo, always be displayed with that logo, or at least that the avatar be displayed with no other logo, for a present session of the user on the digital platform 300, for a number of consecutive sessions of the user on the digital platform, for a period of time, or permanently for the avatar or for the user.

Figure 10:
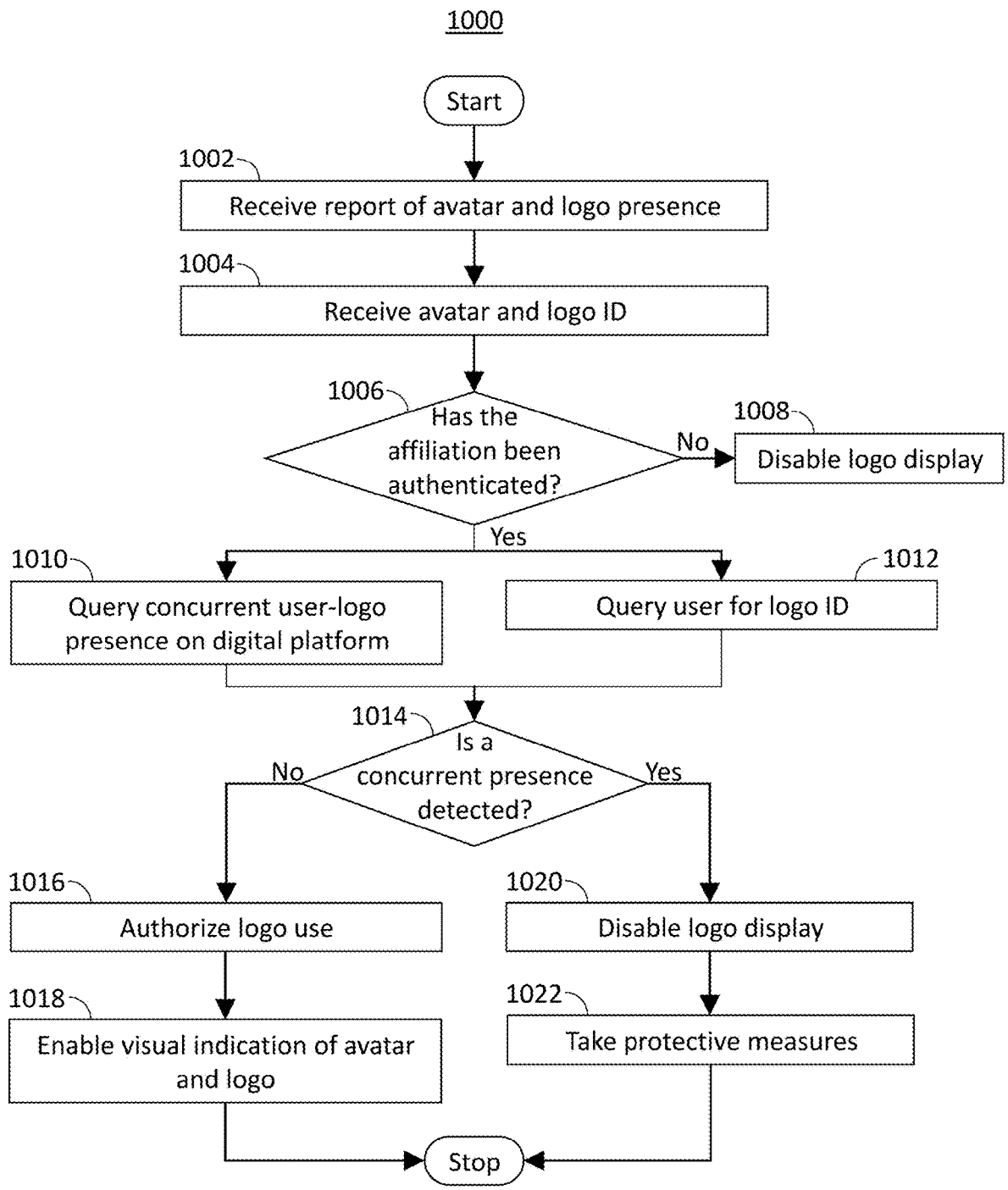
FIG. 10 is a flowchart illustrating an example of a process, upon detection of avatar-logo on a digital platform, for user affiliation authentication with determination of concurrent logo checkout, according to an aspect of the disclosure.

FIG. 10 illustrates a process that may be performed upon detection of an avatar-logo on the digital platform 300. The method 1000 shown in FIG. 10 may be performed, at least in part, by the authenticating server 320 according to an aspect of the present disclosure.

At 1002, the authenticating server 320 receives a report of an avatar displayed in conjunction with a logo on the digital platform 300. Such a report may be submitted by the digital platform 300 upon detection of a logo being used or displayed in connection with the user avatar. If desired, the report may be received from another user of digital platform encountering the avatar displayed with a logo.

At 1004, the authenticating server 320 determines or receives the avatar and logo ID. For example, the authenticating server 320 may query the digital platform 300 for user information associated with the avatar reported, and may then look up in the memory 326 an affiliated logo for the user. In some embodiments, the authenticating server 320 may recognize the logo using machine vision techniques or based on a bar code embedded in the logo or in the avatar.

Based on such identification of the logo and/or avatar about which a report had been received, at 1006, the authenticating server 320 determines whether affiliation of the user is authenticated for the entity associated with the logo. The authenticating server 320, upon receiving the report, may search a database to determine whether the user is affiliated. For example, the authenticating server 320 may first identify based on the report the entity that is alleged by the to be affiliated, and then search a relevant database listing the users affiliated with that entity to determine whether the user designated in the report is on the list. Or, the authenticating server 320 may have access to a list of servers associated with respective entities; upon receiving the request to authenticate, the authenticating server 320 may identify the entity alleged to be affiliated with the user, and then determine the server associated with the entity alleged to be affiliated. Then the authenticating server 320 may query the server associated with the entity to verify that the user designated in the report is affiliated with the entity.

If it is determined that affiliation has not been authenticated ("No" at 1006), then at 1008, the authenticating server 320 disables display of the logo for avatars of the user. For example, the authenticating server 320 may notify the digital platform 300 to discontinue generating display of the logo in connection with avatars of the user.

If the affiliation has been authenticated ("Yes" at 1006), then at 1010, the authenticating server 320 queries digital platform 300 for concurrent user-logo presence. For example, authenticating server 320 may request information from digital platform 300 identifying an avatar and logo. The authenticating server 320 may query the digital platform 300 for identification of a user associated with the avatar reported. Based on the user identification returned by the digital platform 300, the authenticating server 320 may determine whether a unique ID pairing the logo with the avatar exists in its memory 326.

If desired, the authenticating server 320 may query the digital platform 300 for a unique ID linking the logo with the user avatar. Such a unique ID may confirm that the logo has been authenticated for the user. The unique ID may pair the logo with the user, or may associate the logo with a user avatar and with the user. For example, only one (or more) avatar(s) of the user may be approved by the authenticated server 200, as described herein. According to an aspect of the disclosure, an ID may pair the logo with the user, and a second ID may pair the logo with one or more specific avatar of the user in association with the logo may be displayed. Or, the user may be authenticated using a unique user ID, and a second ID may pair the logo with a specific avatar or set of avatars for which it may be displayed. It is also contemplated that a single affiliated entity may have several logos that may be used by a user with a set of avatars. For example, some logo color schemes or logo designs may be more appropriate for some avatars but less so for other avatars. A single ID identifying the user, identifying the logo-user pairing, or identifying the logo-user-avatar (or set of avatars) may be used across one or more digital platforms. For example, the authenticating server 320 may use the same ID in several or in all digital platforms to manage the logo.

If a unique ID pairing the logo with the user does not yet exist, authenticating server may nonetheless determine whether the user is affiliated with the entity described or identified in the logo. Such authentication may be performed anew according to the herein described authenticating processes.

At 1012, in an embodiment, the user may be queried for a logo identification that may evidence previous authentication of the logo for the user. For example, the user device 340 may be caused to generate a user prompt requesting a user-logo identification number, and/or the user-logo-avatar identification number that was previously assigned and notified to user from an earlies authentication. In response to such a user prompt, the identification returned may be the basis for establishing affiliation.

However, as discussed, if the logo has already been checked out for this user, then this may mean that the logo is displayed inappropriately with the subject avatar. Based on the response received regarding the concurrent use, or by other means as discussed above, the authenticating server 320 determines at 1014 whether concurrent presence of the logo-user. This may be accomplished using methods described above in connection with FIG. 8.

If no concurrent presence is detected ("No" at 1014), then at 1016, authenticating server 320 authorizes logo use for the user on digital platform 300. The authenticating server 320 may transmit a notification to the digital platform 300, which may include an indication of authorization and, in some cases, the logo to be displayed with the user's avatar.

At 1018, the digital platform 300 enables a visual indication of the avatar and logo. For example, in response to the notification from the authenticating server 320, digital platform server 300 may enable insertion of the logo into a rendering of the user's avatar.

If a concurrent presence is detected ("Yes" at 1014), then at 1020, the authenticating server 320 disables display of the logo. For example, the authenticating server 320 may transmit a notification, command, or other indication to the digital platform 300 to discontinue generating display of the logo with the avatar. At 1022, the authenticating server 320 and/or the digital platform 300 may take additional measures to prevent display of the logo with the user's avatar. For example, the user may be permanently barred from the digital platform 300, or the user may be kicked off for one or more sessions or for a period of time. According to an aspect of the disclosure the authenticating server 320 may notify the entity and/or the authorities, disable further use of the logo, and/or to take other remedial measures.

Figure 11:
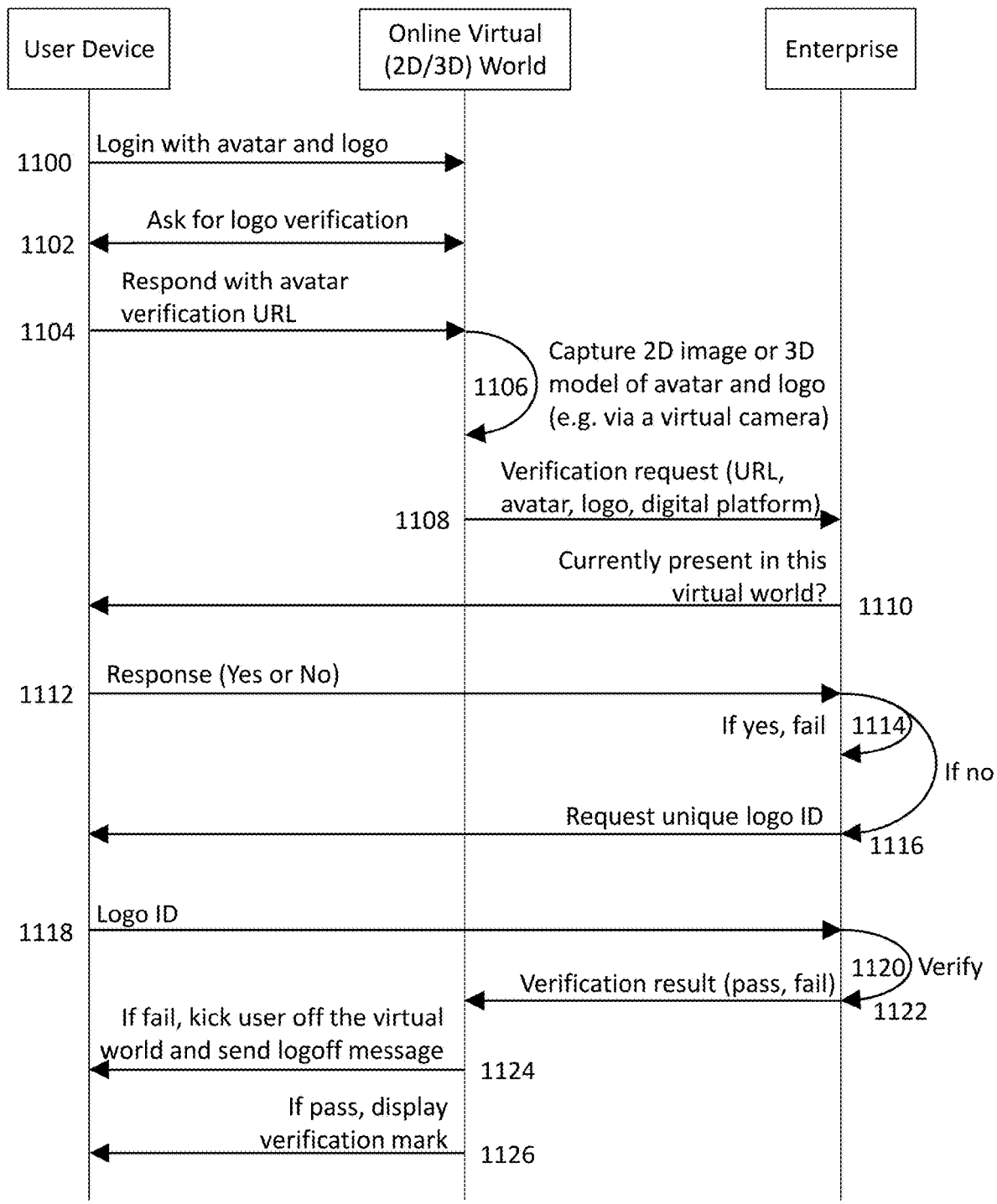
FIG. 11 is a communication/process flow diagram for affiliation authentication of a user with logo checkout authentication, upon detection of avatar-logo on a digital platform, according to an aspect of the disclosure.

FIG. 11 illustrates aspects of a process as a communication/process flow diagram with communication between the user device 340, the digital platform 300, and the authenticating server 320, for example, a server or server system of an entity with whom affiliation is being alleged by the user, according to an aspect of the present disclosure.

At 1100, the user logs in to the digital platform 300 with an avatar and logo.

At 1102, the user may be prompted to enter a logo verification, which is then returned to the digital platform 300.

At 1104 user responds to the prompt with avatar verification URL, which may specify a webpage on the authentication server 320, shown as "Enterprise" in FIG. 11. This webpage may enable the digital platform 300 to communicate with authenticating server 320 for the appropriate entity alleged by user to be affiliated with the user for authenticating the logo.

At 1106, the digital platform 300 may capture a 2D image or a 3D model of the avatar and logo. For example, the digital platform 300 may use a virtual camera to capture this information.

At 1108, the digital platform 300 may transmit this as part of the verification request to the URL earlier received from the user device 340. Note, however, that user device may provide information other than providing a URL, to direct the digital platform 300 to the authenticating server 320, and that information other than a captured image of the avatar with logo may be provided to the authenticating server 320 as a basis for authenticating affiliation of the user with the logo.

According to an embodiment, the logo may include, or may be provided as, an ID, such as a QR code, or other bar code. Such an ID, QR or bar code may be visible to other users or may be visible to other users only when using an augmented reality (AR) device, or may be revealed to other users only after the digital platform 300 or the authenticating platform 200 grants authorization to view the ID, QR or bar code. According to an aspect of this embodiment, such an ID, QR code or barcode may be detectable only by the digital platform 300. For example, an AR device may recognize the ID, QR or bar code, so that other users can verify the authenticity of a logo displayed as a badge on a person. By way of illustration, a group of users in an AR environment, or in a virtual world environment, may wish to check who the members of a group are for a specified activity, and may do so by checking the ID, QR or barcode displayed or accessible on badges of other users to make sure that each participant is an authenticated affiliate of a certain entity. They may also capture the ID, QR or barcode of the logo and submit it for authentication.

Authenticating server (shown in FIG. 11 as "Enterprise") may then use this captured information to verify an affiliation between the user and the entity to which the URL pertains. According to an embodiment, if the logo image captured by the virtual camera does not match what the authenticating server 320 has stored as the logo of the affiliated entity, then authentication of the affiliation may fail for this user.

At 1110, in an embodiment, the authenticating server 320 may query the user device 340 as to the online presence of the user at the current time. If desired, the authenticating server 320 may query the digital platform 300 for the concurrent presence of the user on the digital platform 300.

At 1112 a response to the query for concurrent presence of user is returned to the authenticating server 320. Accordingly, the authenticating server 320 makes a decision as to whether to affiliate user accordingly.

At 1114, if the response is "Yes," indicating that there is a concurrent present of the user-logo affiliation on the digital platform affiliation fails.

At 1116, if the response is "No," indicating that no concurrent presence was detected, then authenticating server 320 requests the logo ID from the user device 340.

At 1118, a user may be assigned a logo by the user's employer or other affiliated entity, and the user device 340 may return the logo ID to the authenticating server 320. This prompting of the user for the logo ID may serve as an additional validating step for authenticating the affiliation between the user and the entity's logo. In some instances, this prompting of the user for the logo ID may streamline the process on the part of the authenticating server 320 in determining which logo of the affiliated entity to assign to the specific user.

At 1120, the authenticating server 320 determines the verification result of the authentication.

At 1122, this is communicated to the digital platform 300.

At 1124, if the authentication fails, the digital platform 300 may kick off user from the digital platform 300, or the digital server 300 may transmit a logoff message to the user device 340.

In an embodiment, once authentication fails, any action that this user has performed on the digital platform 300, such as messaging, video, transactions with other users, spatial movements or the like may be deleted form the digital platform 300. Such deletion may be performed based on request of the authenticating server 320 or at the discretion of the digital platform 300. Or, such actions may be marked as inaccurate/not yet vouched for or unaffiliated with the enterprise. Other users with whom such interactions occurred may be notified by the digital platform 300 by additional notifications that those actions of the user may be inaccurate/not yet vouched for or unaffiliated with the enterprise.

Such actions/movements of the user may be marked as unauthenticated, for example, marked with a question mark or with other words indicating unauthenticated when they are created by the user until such time as authentication of the affiliation succeeds. The digital platform 300 may keep a log of actions of the user while unauthenticated and report back data about such user actions to the authentication server 320.

At 1126, on the other hand, if verification succeeds, then the digital platform 300 may enable display of the logo or other the verification mark in conjunction with the user avatar, or may generate display of such verification mark, including logo, in conjunction with the avatar of the user.

According to an aspect of the disclosure, after an avatar is authenticated and the graphical indication of affiliation is displayed for the avatar on the digital platform 300, the avatar's movements, actions, messages and other interactions with other users, comments and the lime may be recorded by the digital platform 300. Such logged data may be transmitted to the affiliation server 320, at set periods or upon request of the affiliation server 320, or upon the occurrence of some events, such as the end of the user session on the digital platform 300, the end of the subscription of the user for the digital platform 300, the expiration of the authentication of affiliation with the entity, the denial of access of the avatar to a portion of the digital platform 300, or the like. Such a log may be useful for a variety of reasons including but not limited to audit and compliance. If the entity finds issues within that logged data after analysis, it may have the option of revoking the graphical indication of affiliation from this user, for a limited time or permanently, for further use on the digital platform 300 or for all platforms.

Figure 12:
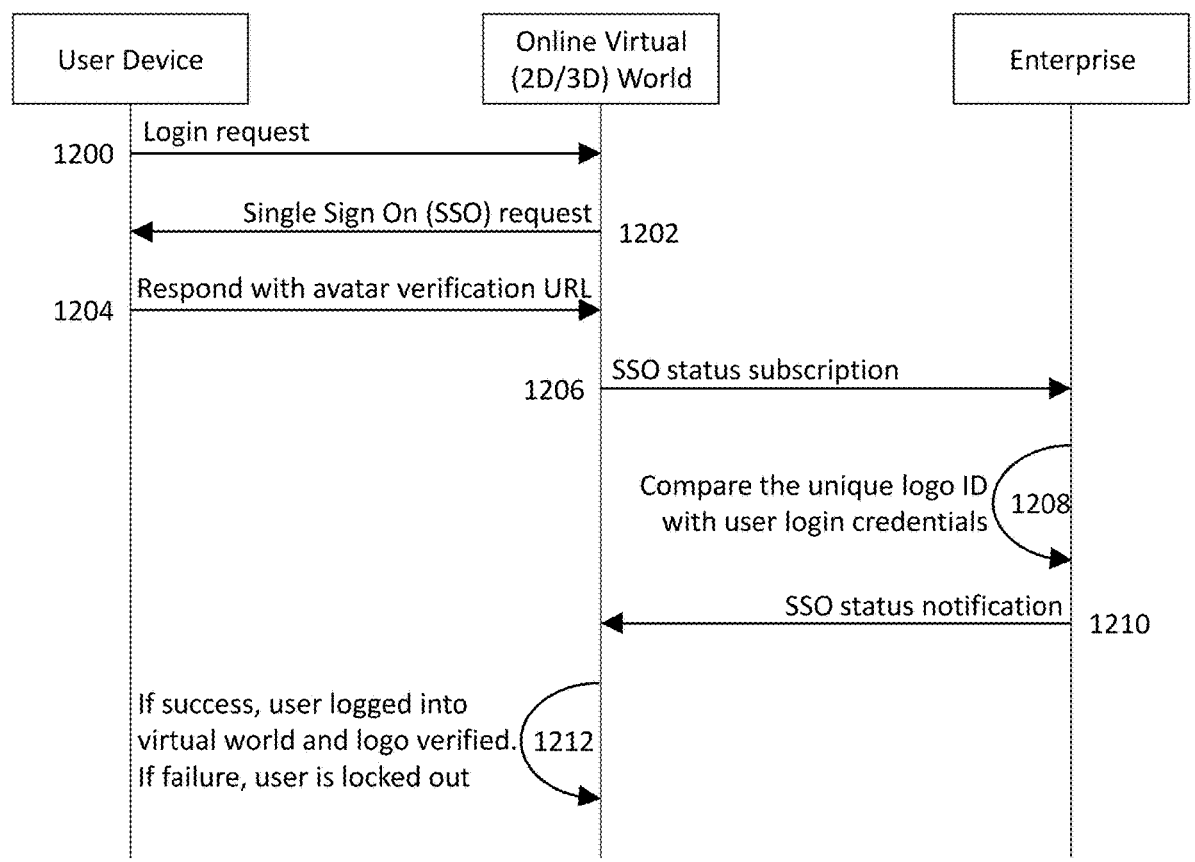
FIG. 12 is a communication/process flow diagram for SSO affiliation authentication of a user, according to an aspect of the disclosure.

FIG. 12 illustrates an authentication process using an SSO (Single Sign-On) process, in which user device 340 signs on to digital platform 300 and to enterprise server (authenticating server 320) using a single sign on.

At 1200 user logs in to the digital platform 300, indicated in FIG. 12 as the online virtual (2D/3D) world.

At 1202, the digital platform 300 prompts the user device 340 for a single sign-on request.

At 1204 the user device responds with an avatar verification URL. However, it will be appreciated that other ways of indicating an entity with which the user is claiming affiliation may also be used.

At 1206, the digital platform 300 transmits the SSO status subscription to the authenticating server 320.

At 1208 the digital platform 300 decides whether to authenticate by comparing the unique logo ID stored therein with the user credentials received.

At 1210, the authenticating server 320 transmits the SSO status notification to digital platform 300.

At 1212, the digital platform 300 determines whether login was successful and whether logo is verified. If unsuccessful, user may be locked out of the digital platform 300. If successful, then the user's avatar may be used with the logo of the affiliated entity on the digital platform 300.

In an embodiment, the avatar-logo pairing information may include aspects or requirements for the logo or other visual indication or may include some standards for the logo or other visual indication but not an entire logo design. For example, the aspects or requirements may include NASA in capital letters and the color scheme but not other specifics of the logo. The digital platform 300 may prompt the user via the user device 340 to enter one or more available logo design selections, or one or more available designs, or one or more aspects of available design, for the logo or other visual indications of affiliation for the avatar. The user may then be able to design or to select the logo or other visual indication, or be able to import aspects of the design, to be added to the fixed aspects or requirements for the logo or visual indication that have been stipulated by the authenticating server 320.

In an embodiment, access to the portion of the digital platform 300 may be granted depending on the rank or status within the entity. Such rank or status may be reflected in the type of logo displayed for the entity. For example, a logo reflecting status as a board member of an entity may entitle access to the portion, such as a board meeting or virtual board room, but a logo reflecting status as an employee of the same entity may be insufficient for access to the portion.

In such an embodiment, access to the portion of the digital platform 300 may be granted depending on the rank or status within the entity. Such rank or status may be reflected in the type of logo displayed for the entity. For example, a logo reflecting status as a board member of an entity may entitle access to the portion, such as a board meeting or virtual board room, but a logo reflecting status as an employee of the same entity may be insufficient for access to the portion.

Or by way of further illustration, such an avatar may be allowed additional privileges in a virtual space or with a virtual object of the digital platform 300. For example, such an avatar may be allowed extra turns, or longer turns, on a virtual ride, may be given VIP guest access at a concert or other event, may be allowed to test or to use some virtual equipment or vehicle on digital platform.

According to an embodiment, in an augmented reality implementation, a real person with a virtual logo displayed or otherwise applied may be allowed to view or to interact with a princess character in an amusement park, or the like because Company X purchased ticket for its employees, or purchased higher tier tickets entitling logo displayers to VIP access. According to an aspect of this embodiment, a real person in an amusement park or museum may have such special access or other privileges when a virtual logo is applied. The logo may be displayed, or may be applied but not visible except by users using AR equipment or except by a machine. For example, the logo may include an ID, such as a QR code or other bar code, that grants such special access for the user.

Figure 13:
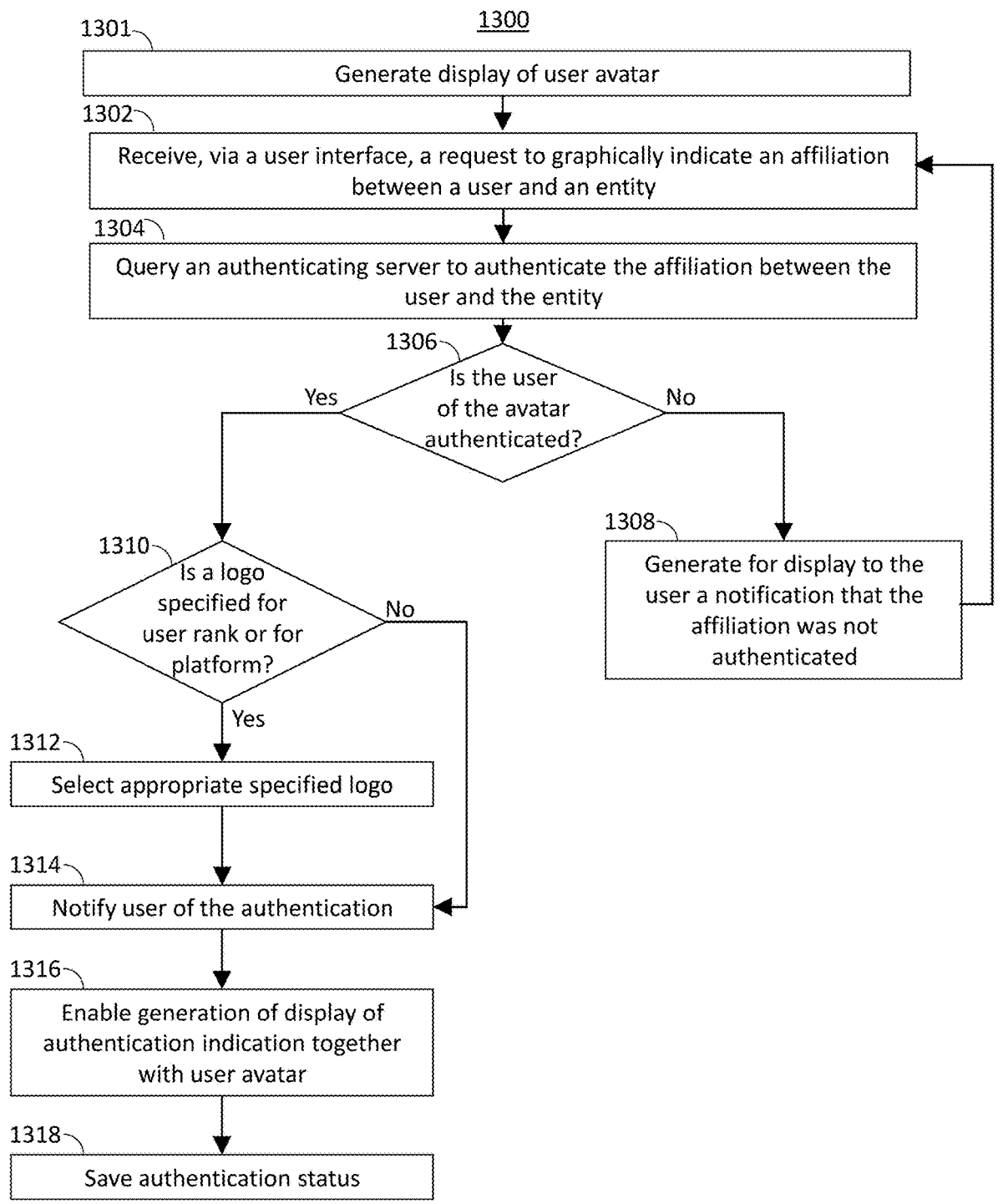
FIG. 13 is a flowchart illustrating an example of a process for authorizing access to a portion of a digital platform, such as a virtual space, virtual object, avatar action or interaction, or interacting with specific other avatars or classes of other avatars, according to an aspect of the disclosure.

Such an embodiment is illustrated in FIG. 13.

At 1302, a request is received to graphically indicate, for example using a logo, an affiliation between a user and an entity. This may be accomplished using methods described above in connection with FIGS. 5 and 7.

At 1304, the digital platform 300 may query the authenticating server 320 regarding an affiliation between the user and an entity. This, too, may be accomplished using methods described above in connection with FIG. 5.

At 1306, the authenticating server 320 may determine whether the user of the avatar is to be authenticated, that is by determining affiliation between the user and the entity. This may be accomplished using methods described above in connection with FIG. 5. If the user of the avatar is not authenticated ("No" at 1306), then processing continues to 1308.

At 1308, the digital platform 300 generates for display to the user device 340 a notification that the affiliation is not authenticated. This may be accomplished using methods described above in connection with FIG. 5.

On the other hand, if the affiliation is authenticated ("Yes" at 1306), then at 1310, the digital platform 300 determines whether a specified logo showing the rank or status of the user within the affiliated entity or a logo specific to the digital platform 300 is to be used. For example, a more professionally-oriented digital platform 300 may be assigned a more formal logo of the entity, while a more recreationally-oriented platform may be assigned and more "fun" logo.

If a logo is specified ("Yes" at 1310), then at 1312, the digital platform 300 selects an appropriate specified logo.

At 1314, after selecting the appropriate specified logo, or if no logo is specified ("No" at 1310), the digital platform 300 notifies the user that the authentication has been successful, and may be shown a preview of the logo or the type of logo or other visual indication that is to be used. As discussed, according to an embodiment, user may be given a choice of logo design and/or placement at or near the avatar.

At 1316, the digital platform 300 enables generation of the display of the authentication indication, such as the logo, together with the user avatar, or the digital platform 300 may generate display of the authentication indication together with the user avatar.

At 1318, digital platform 300 saves the authentication status. These actions may be accomplished using methods described above in connection with FIG. 5. An image of the logo may be saved in memory 306 of digital platform 300, or an identification of the logo may be saved so that the logo image may be later retrieval from an external source, such as from authenticating server 320.

According to an aspect of the disclosure, the authentication confirmation may depend on the type of the digital platform 300 that is requesting the authentication. For example, an organization or entity may have standards for what types of associations it wishes for itself. Accordingly, sexually explicit digital platforms, or spaces on digital platforms that are sexually explicit, or digital platforms affiliated with extreme political groups, or such spaces on digital platforms, may be on a blacklist for which the authenticating server 320 will not authenticate affiliation logos. Also, the digital platform 300 may maintain such a blacklist of spaces on the digital platform, and may automatically prohibit, or may automatically query for permission by the authenticating server 320 for a user that has been previously authenticated as being affiliated with an entity by the authenticating server 320, before allowing an avatar of the user displayed with the logo or other visual indication, to enter such a space on the digital platform 300.

The user and logo confirmation received from the authenticating server 320 may be a unique (alpha)numeric ID pairing the user with the logo. Based on this, the digital platform 300 may enable visual indication of the affiliation with the avatar, and may generate visual display of the logo with the avatar. For example, a logo on a badge, or uniform of the affiliated entity, may then be caused to be displayed for the avatar of the user.

The digital platform 300 may allow a user to maintain multiple avatars, such that in different virtual spaces the user may manifest with a different appearance/virtual personality. Thus, a user may take on different appearances and personas in different situations, as selected by the user and/or the digital platform. Accordingly, the same logo or affiliation indication, or a different logo or affiliation indication, may be displayed for avatars of the same user. For example, when the user wishes to engage in a virtual space recognized as an airline captain with an airline authenticated as being affiliated with the user, the user may wish to have the logo of the airline with which he is affiliated be displayed with the user avatar, but when the same user interacts in a virtual space in which he wishes to be recognized as a licensed bartender the user may wish the logo of an affiliated bar or a bartending licensing authority or bartending school to be displayed with the user's avatar. In an example, the user may have one avatar and logo as airline captain and a second avatar and logo for interacting on the digital platform 300 with the logo as bartender. Or the avatar may be the same in both instances.

Any other avatars of this user on the digital platform 300, according to an aspect of the disclosure, may then be automatically authenticated for use of the logo or other visual indication of affiliation. The user may then choose to have the logo or other visual indication be displayed for such other avatars of the user on the digital platform 300. Or, according to an aspect of the disclosure, the logo or other visual indication might not be automatically displayed for all other such avatars of the user on the digital platform 300, but the user may control on which of the user's avatars the logo is displayed. For example, the user may wish to be seen as an airline pilot with some of his/her avatars but not with other avatars.

According to an aspect of the disclosure, the type of avatar for which the authenticating server 320 authenticates a logo may be subject to approval by the authenticating server 320. For example, the authenticating server 320 may specify a standard specified avatar, or may specify that the avatar be, or include, a photograph of the user.

As an alternative, the avatar may be transmitted to the authenticating server 320 for human or automated determination whether the avatar is suitable in view of the policy of the entity. For example, a machine-learning model may be used to determine automatically that an avatar has an appearance that is "presentable." Some entities may wish to define suitable avatars as avatars that appear human, including a photograph, or a cartoon version of a photograph, or the like. Some entities may insist that the avatar include a photograph of the user in business attire or the like.

An embodiment is contemplated in which access to portion of a digital platform may be restricted based on the authentication of a logo. A user may wish to access a portion of the digital platform 300, such as a virtual world. Display of the logo may be restricted to a portion of the digital platform 300, that is some virtual spaces, virtual objects, other user avatars, or some types of avatar interactions within the digital platform 300. Some spaces or objects or avatars on a digital platform may be deemed by an entity to be inappropriate for display of the entities logo because the subject matter of the type of space, object or type of user interaction does not pertain to the business of the entity or the expertise of the entity's employees and associates, or because the subject matter of the type of space or object, or the types of user interactions is deemed to be unseemly or inappropriate in view of the brand of the entity.

In some embodiments, a portion of the digital platform 300 to which access is controlled may feature privileged communications, or may provide interactions with a group of avatars that have access to confidential communication rights, such as access to group chats on the digital platform 300.

A portion of the digital platform 300 to which access is controlled may be a set of actions of the avatar. For example, an avatar with a logo that identifies affiliation with Company X may have access to a restricted recreational virtual area of the digital platform 300, because of a relationship between Company X and the proprietor of the recreational area, or between Company X and the company that owns the digital platform 300. That is, a company may wish to offer as a perk to its employees special privileges on one or more virtual spaces. Similarly, a company may wish to restrict access to a virtual space on digital platform 300 to a class of personnel, such as a professional convention, or such as a seminar or board meeting of Company X. Accordingly, access to the virtual activity or to the virtual space may be restricted to all but those with the appropriate company logo.

Access to a portion of the digital platform 300 may be based on a whitelist: a virtual room or other space in a virtual world, or a set or a type of digital platform spaces, etc., or in AR implementation or other type of digital platform, that are allowed. Additionally or alternatively, access to a specified portion of the digital platform 300 may be controlled according to a blacklist: a virtual room or other space in a virtual world, or a set or a type of digital platform spaces, etc. may be prohibited. Such whitelists or blacklists may be specified in a logo policy of the authenticating server 320 and/or the digital platform 300.

Such a portion of the digital platform 300 may be, or may include, a type of user activity or user interaction, or may be a list of users of avatars on a digital platform with whom the user with the logo is not allowed/allowed to interact. The portion of the digital platform 300 may be, or may include, virtual objects, such as certain types of virtual tools, instruments, valuables, or other assets on a digital platform, types of virtual interactions with one or more other avatars, or with any avatars, on the user platform, or privileges, rights, statuses or roles on a digital platform. For example, interactions of a transactional or commercial nature may be prohibited for the avatar with logo. The portion of the digital platform may be, or may include, interaction with some identified users or their avatars, or with a class of users and their avatars.

Figure 14:
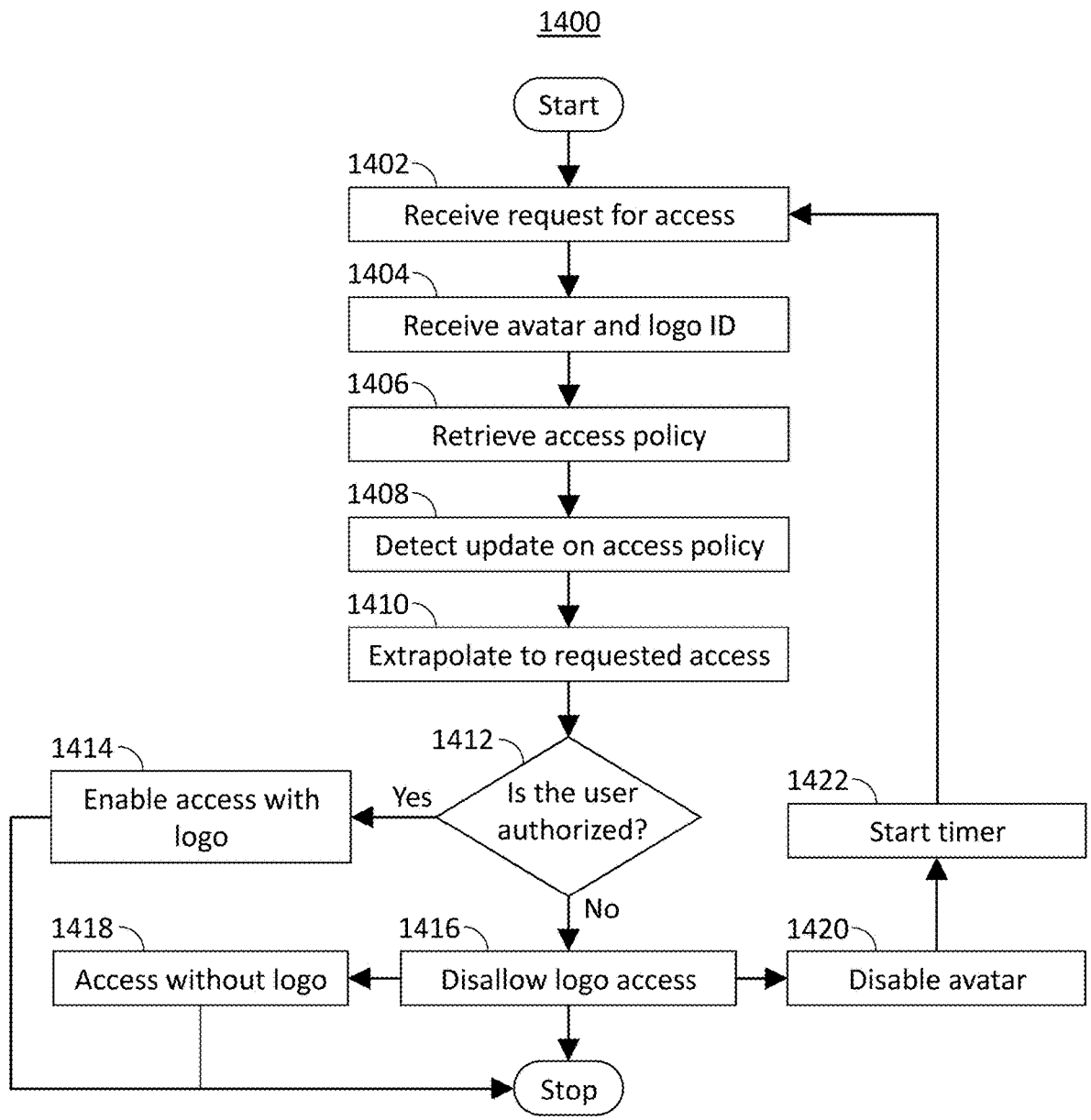
FIG. 14 is a flowchart illustrating an authorization process for a user-logo combination to access a portion of a virtual world or a portion of an augmented reality, which may be performed by digital platform, according to an aspect of the disclosure.

FIG. 14 is a flowchart that illustrates aspects of an authorization process for a user-logo combination to access a portion of a virtual world or a portion of an augmented reality, which may be performed by the digital platform 300.

At 1402, digital platform 300 receives a request for access from a user. For example, a user with an existing user-logo pairing may transmit a request for accessing a particular virtual space, virtual object, type of interaction, or interaction with another type of user avatar, or interaction with a particular user avatar on a digital platform 300.

According to an aspect of the disclosure, such a request may be transmitted automatically for a user, without prompting the user, when a user directs the user avatar to access the portion of the digital platform 300, or in an AR implementation, when a user attempts an action. In a similar vein, permissions for such access may be transmitted automatically at user sign in for a session on the digital platform 300.

The request for access may be transmitted by the user device 340, or by the digital platform 300 to the authenticating server 320.

At 1404, the digital platform 300 receives a user-logo ID, or user-avatar-logo ID. The user-logo ID or user-avatar-logo ID may be received or retrieved from a user profile saved in the memory 306.

Note that, while a unique ID user-logo pairing the logo and user is described, an avatar-logo pairing may be identified with a unique ID, so that only a particular avatar of the affiliated user is thus enabled or disabled for display. Also, other ways of associating the avatar and logo may be provided. For example, the authenticating server 320 and/or the digital platform 300 may use a lookup table each time a logo-avatar pairing is to be authenticated.

At 1406, the authenticating server 320 and/or the digital platform 300 retrieve an access policy for the virtual space, virtual object, type of avatar interaction, type of role or status on the digital platform 300, interaction with a type of class of users, interaction of a specific other user/user avatar or class of other avatars for the requested user-logo. Some entities may allow access to this aspect of the digital platform while others may not.

At 1408, the digital platform 300 or the authenticating server 320 detect an update to the access policy. For example, an update to the access policy may be requested by the digital platform 300, the authenticating server 320, or an administrative user of the entity to which affiliation is being authenticated. Such an update may include more or less restrictive access, or may include portions of the digital platform not previously referenced in the policy.

In an analogous manner, the digital platform 300 may request an update of authentication for a user in connection with a logo. Employees and other people affiliated with an entity at one time may cease affiliation without notifying the digital platform 300. Accordingly, at set intervals, at each user logon, or after a set number of user sessions on the digital platform 300, digital platform 300 may request confirmation of continued authorization of the logo for the user, and/or of the logo with the avatar, from authenticating server 320. Continued display of the logo for an avatar may be contingent on positive confirmation of authentication.

As shown at 1410, it may be necessary to extrapolate the access policy to the virtual space, virtual object or avatar interaction requested. That is, and affiliated entity, or an authenticating server 320 implementing affiliate entity policy, may not have every conceivable virtual space, virtual object, avatar interaction, list/type of other users of the particular digital platform 300 registered and explicitly covered by the access policy. Thus, the digital platform 300 and/or the authenticating server 320 may have to detect aspects of the portion of the digital platform to which access is being requested, that is, to the virtual space, to the virtual object, to the user action/interaction or type of user action/interaction, to interaction with another user or class or group of users, to information or data stored, streaming or otherwise available on the digital platform, or to a combination or to an aspect of the foregoing.

According to an embodiment, such extrapolation may be performed according to a hierarchy of restricted access. For example, a class of virtual spaces or interactions may be deemed offensive and thus access may be prohibited. A first virtual space may be slated to contain, or may be detected at the time to contain, violence between avatars. The digital platform 300 may thus extrapolate that access to the first virtual space should be denied because violence is worse than offensive behavior, according to the hierarchy specified for the digital platform 300.

Based on the access policy detected or the extrapolated, at 1412, the digital platform 300 or authenticating server 320 determine whether the user is authorized. This may be accomplished using methods described above in connection with FIG. 5.

If access is authorized ("Yes" at 1412), then at 1414, access to the portion of the digital platform is enabled with visual indication of avatar and logo.

Access to the portion of the digital platform 300 may be granted for a period of time, for a duration of a user session on digital platform, for a set number of user sessions on digital platform, or indefinitely or permanently. Such access to the portion of the digital platform 300 may be granted only for a specified avatar of a user or specified set of avatars of the user. Such access to the portion of the digital platform 300 may be granted only for when the logo is displayed for the avatar during access to the portion of the digital platform 300 or may be granted even without display of the logo during access to the portion of the digital platform 300.

On the other hand, if the user is not authorized ("No" at 1412), access to the portion of the digital platform 300 with the logo is disallowed. According to an embodiment, upon denial of access, one or more of several additional steps may be taken, for example, because the portion of the digital platform 300 included or entailed something deemed by access policy to be inappropriate for the brand of the entity. Such additional measures may include at 1418 allowing of access for the avatar or for another avatar of this user but without the logo displayed. For example, the entity may not care if the user accesses such a portion so long as the logo showing affiliation with the entity is not displayed.

According to an aspect of the disclosure, if entry into such a virtual space is prohibited, or if authorization is not received from authenticating server 320 for the portion of the digital platform 300, the avatar may be permitted to enter but without the logo being displayed in that virtual space or for that portion of the digital platform 300. According an aspect of the disclosure, since the avatar is associated in the mind of other users with the affiliated entity, as shown at 1420, the avatar may be prohibited from entering the virtual space for a set period of time.

At 1422, digital platform may start a timer, at the end of which the avatar may be allowed access to the portion of the digital platform without the logo. Or, the avatar may be prohibited access to the portion of the digital platform for the duration of the user session on the digital platform 300, or may be permanently barred from entry, even without the logo displayed. Such disallowing or disabling may be for the session of the user on the digital platform 300, for several sessions, for a period of time, or permanently.

The rule that governs for how long or for what duration the avatar without the logo is barred from the portion of the digital platform 300 may be determined by digital platform 300, or may be determined by the authenticating server 320 and communicated to the digital platform 300. Similar approaches for controlling access may be used for access to some virtual objects, access to some other user avatars, and/or access to some type of avatar interactions. That is, such access may be denied only for display of the avatar-logo combination, or may be denied for display of the avatar without affiliated logo permanently, for the duration of the session, or for a period of time, such a denial determination set according to a policy of the digital platform 300 or the policy of the authenticating server 320.

Figure 15:
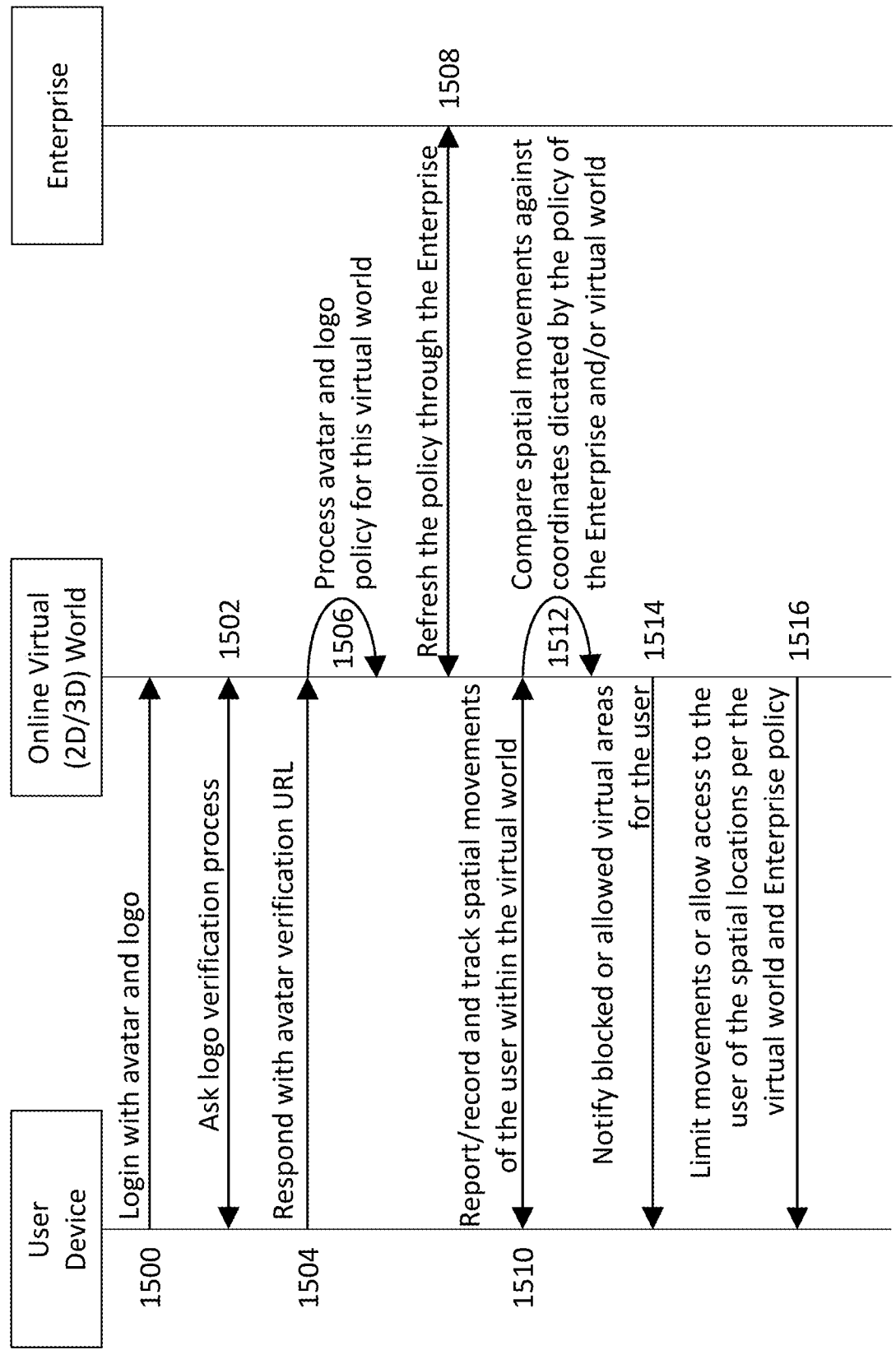
FIG. 15 is a communication/process flow diagram for access authorization to a virtual space or virtual object, according to an aspect of the disclosure.
Figure 16:
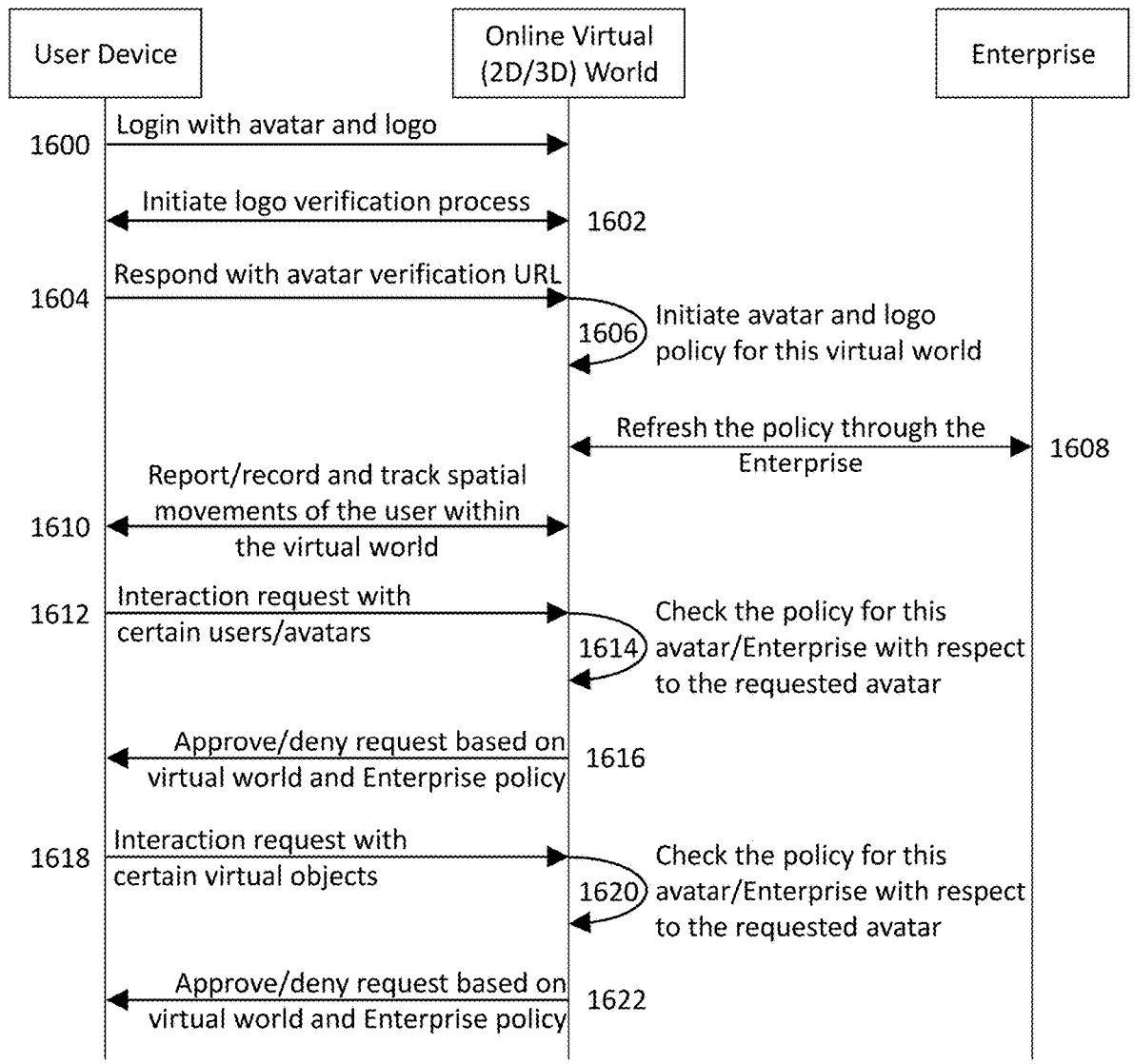
FIG. 16 is a communication/process flow diagram for access authorization for avatar interaction, according to an aspect of the disclosure.

Aspects of the process illustrated in FIG. 14 are shown in the communication/process flow diagrams of FIGS. 15 and 16 with respect, respectively, to access control for a virtual space, and access control for a virtual object or avatar interaction.

According to an aspect of the communication/process flow illustrated in FIG. 15, at 1500, user logs in with the avatar and logo indicating the alleged affiliation.

At 1502 digital platform 300 initiates the verification process, for example, by prompting user to enter the URL for an affiliated entity.

At 1504 user responds with an avatar verification URL. Although not shown in FIG. 15, the user-logo affiliation may then be authenticated by authenticating server 320, or digital platform 300 may have previously stored the user-logo authentication.

At 1506 digital platform 300 may look up access policy for the user's avatar and logo. As discussed, the access policy may contain a whitelist and/or a blacklist of virtual spaces, or types of virtual spaces, a list of virtual objects or types of virtual objects, a list avatar actions or types of avatar actions, a list of interactions with other avatars or types of interactions with other avatars, a list of other avatars or types of other avatars, a list of other users or types of other users, that are permitted and/or prohibited.

At 1508 the access control policy of the entity may be checked by querying the authenticating server 320 for any updates. As discussed, the authenticating server 320 may maintain different access policies for different entities for which it authenticates.

At 1510, the report is received by digital platform of spatial movements of the user avatar within digital platform.

At 1512, the spatial movements on the digital platform are compared against coordinates dictated by the policy of the affiliated entity.

At 1514, the user is notified as to whether access to the virtual space on the digital platform is allowed or is blocked.

At 1516, the digital platform, according to the previous access control decision, limits movements or allows movements of the user avatar to the space or spaces in question on the digital platform 300.

Access to one or more portions of the digital platform 300, including events, games, meetings, user actions, interactions with other users, and/or virtual rooms available thereon, may be controlled in accordance with a verified affiliation of a user, or in accordance with a rank of a user with an affiliated entity of the user. According to an aspect of the communication/process flow illustrated in FIG. 16, access to certain virtual objects or interactions of a certain type are controlled.

At 1600, user logs in with the avatar and logo indicating the alleged affiliation. At 1602 the digital platform 300 initiates the verification process, for example by prompting user to enter the URL for an affiliated entity.

At 1604 user responds with an avatar verification URL. Although not shown in FIG. 14, the user-logo affiliation may then be authenticated by the authenticating server 320, or the digital platform 300 may have previously stored the user-logo authentication.

At 1606, the digital platform 300 may look up access policy for the user's avatar and logo. At 1608, the access control policy of the entity may be checked by querying the authenticating server 320 for any updates.

At 1610, the report is received by digital platform of spatial movements of the user avatar within digital platform.

At 1612, attempted or actual actions or interactions of the avatar with other avatars are detected.

According to an embodiment, an action of the avatar, access to virtual object, or the interaction with another avatar is controlled, at least in part, according to the previously determined spatial positioning of the avatar. For example, the digital platform 300 may keep track of which virtual objects or which other user avatars are in which virtual space, and access to those virtual objects or access to those other user avatars may be controlled accordingly.

At 1614, the entity's policy for the particular action or interaction is checked. This may be done at the authenticating server, or may be done by the digital platform 300 as shown in FIG. 16.

At 1616, the action or interaction or request for access is approved or denied by the digital platform 300, according to the previously determined policy. The approval or denial may be based on rank or status of the user with the affiliated entity. The access policy may specify differing access depending on the rank of the user with the entity.

Then, at 1618 an a further attempted or actual action, interaction or request for access of the avatar is detected.

At 1620, the policy is checked for this. The further action or request for access detected at 1618 may be a more highly restricted action or a more highly restricted access then the one at 1612. For example, the avatar may have requested access to a conference being run by the affiliated entity at 1612. This access was authorized since the user has an authorized affiliation with the entity. Then the user may wish to gain access to a VIP lounge or to a stage or dais of the conference of the entity. Access to this has be checked as this more highly restricted access may depend on a rank of a user at the entity. It will be understood that rank of the user may mean a status with the entity, such as fulltime or parttime, retired or active, executive or employee, student or faculty member, appointed for a task or committee or general attendee, or the like.

At 1622 the further action, interaction or request for access is allowed or denied on the digital platform 300.

Other users may wish to initiate display of the graphical indication of affiliation of the avatar's user with the entity because they may wish to verify that the avatar's user is who he or she claims to be. Thus, the request to indicate affiliation between the user of the avatar and an entity may be generated based on an interaction by another user with the avatar. For example, another user (hereinafter "enquiring user") may wish to know the entity with which the avatar's user is affiliated. According to an embodiment, the avatar may have a preset display space, for example, at a chest of the avatar or on a cap of the avatar, that when clicked on by the other users automatically generates a request to authenticate affiliation of the avatar's user and, upon successful authentication, displays a graphical indication of the affiliation of the avatar's user with an entity. For example, employees of a company may wish to have a private meeting with fellow employees on the digital platform 300 and may thus want to see whether an avatar who is unidentified belongs in the meeting.

User actions to request authentication of affiliation and to display graphical indication of the affiliation may include hovering with a cursor over the avatar, or over a portion of the avatar, or may entail one or more other such graphical user interface actions by the enquiring user. The digital platform 300 may provide other graphical user interface objects with which an enquiring user can interact to request authenticating affiliation and displaying affiliation of the avatar's user.

Figure 17:
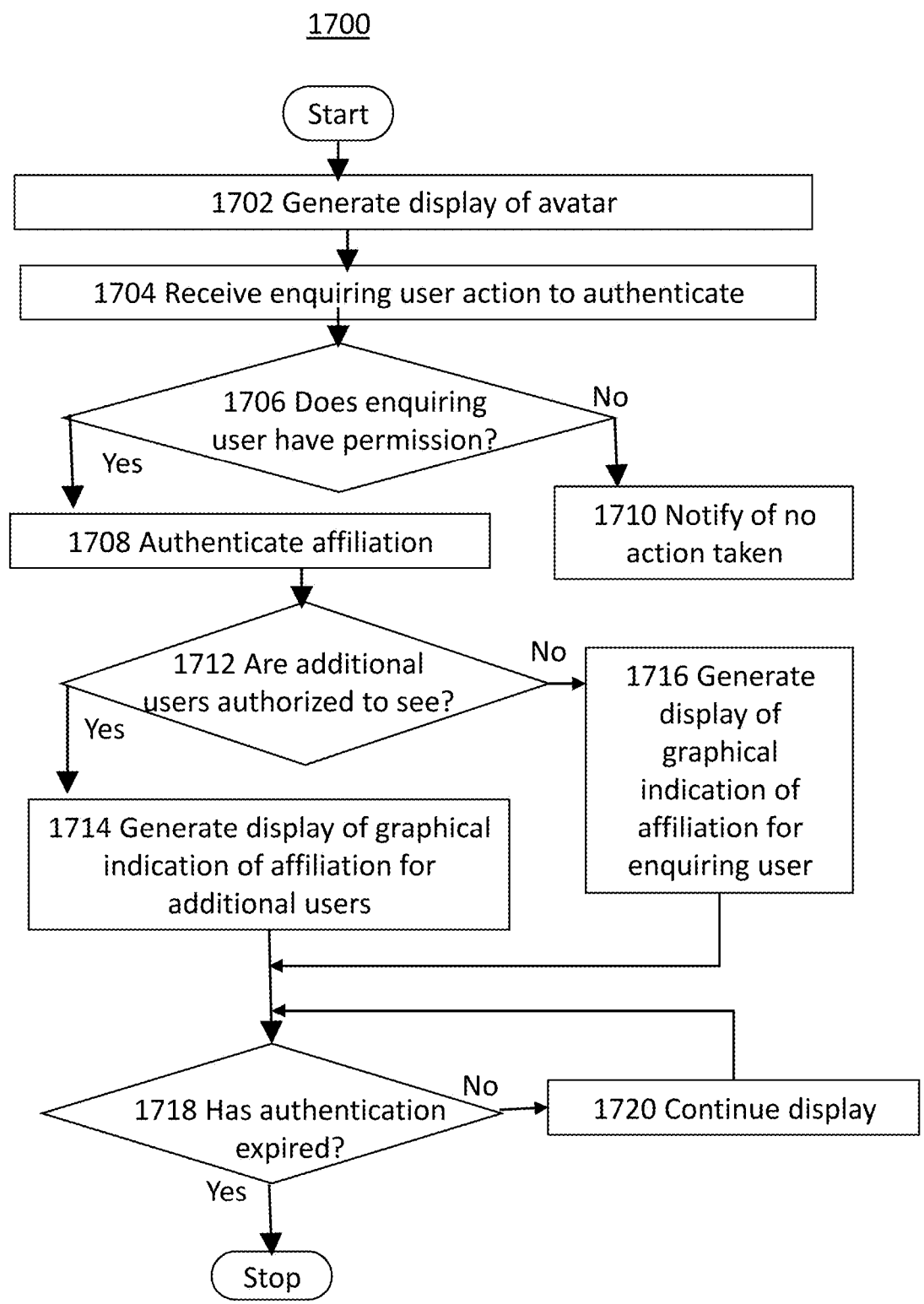
FIG. 17 is a flowchart illustrating a process for other users to initiate authentication of an avatar of a user, according to an aspect of the disclosure.

A process for other users to initiate authentication of an avatar of a user is shown in flowchart 1700 of FIG. 17.

After system start, at 1702 the digital platform 300 displays a user avatar, as discussed above in regard to other embodiments.

At 1704, the inquiring user's action to authenticate is received by the digital platform 300. As discussed, this inquiring user action to authenticate may comprise a graphical user interface action at the avatar, such as a mouse click on a display space shown on the avatar or on the avatar generally.

At 1706, it is determined whether the inquiring user has permission to request authentication and to see the graphical indication of affiliation for the user of the avatar. As discussed, this permission may be obtained from the avatar's user. In an embodiment, the user of the avatar may be informed that an enquiring user has requested that the affiliation of the user of the avatar be authenticated and displayed.

According to an aspect of the disclosure, the user of the avatar may decide to decline authenticating the affiliation and displaying indication of the affiliation in response to the request of the enquiring user. In an embodiment, the avatar's user may request that he or she be shown the identity of the enquiring user. For example, the avatar's user may wish to display affiliation only to those users who are also affiliated with the entity. The avatar's user may request that affiliation of the enquiring user be displayed. The permission may be provided by the entity with which the user of the avatar is affiliated. For example, a concert or performance sponsor may be the entity and thus the door monitors or ushers at the concert may be authorized by the entity to check for authentication of users who wish to enter (ticket holders) and to initiate graphical indication of user affiliation. According to an aspect of the disclosure, upon authentication of the affiliation, if the user of the avatar is affiliated with an entity other than the concert or performance sponsor, then such an affiliation would not be displayed. That is, according to this example, the door monitors or ushers would be authorized by the concert or performance sponsor to initiate display only of graphical indication of affiliation with the concert (i.e. the user of avatar has a ticket for the concert or performance), not for graphical indication of affiliation with other entities.

If the inquiring user has permission ("yes"), then at 1708 affiliation of the user of the avatar is authenticated, as discussed above with regard to previous embodiments. The authentication server 320 may be inquired as to authentication of affiliation of the avatar's user with the entity.

On the other hand, if the inquiring user has no permission then at 1710 the inquiring user may be notified that no authentication request has been initiated. In the alternative or in addition, the avatar's user may be notified that an attempt to authenticate was initiated. Further, the avatar's user may be informed of the identity of the inquiring user.

At 1712, it is determined whether additional users, that is users besides the inquiring user, are authorized to view the display of the graphical indication of affiliation of the user of the avatar. As discussed, such authorization to view the display may be contingent on the status of the additional users, for example if the additional users are also affiliated with the same entity, and/or may be contingent on authorization provided by the user of the avatar. Such authorization to view the display may be contingent on the additional users first having had their affiliations authorized and the graphical indication of affiliation displayed.

Display of the graphical indication of affiliation may be limited to a user. For example, the avatar's user may request that upon authentication of affiliation, only the requesting user be shown the graphical indication of affiliation. Or, the avatar's user may request that upon authentication of affiliation, only a class of users be shown the graphical indication of affiliation. For example, the avatar's user may wish only users who are authenticated as affiliated with the same entity as the avatar's user be displayed the avatar user's graphical indication of affiliation. Similarly, the avatar's user may wish only users who are authenticated as being affiliated with the same entity as the avatar's user and at a certain rank or higher with the entity be displayed the avatar user's graphical indication of affiliation. The avatar's user may wish only users who are authenticated as being affiliated with an entity and invited to a specified event on the digital platform 300 be displayed the avatar user's graphical indication of affiliation. Or, the avatar's user may request that upon authentication of affiliation, only those enquiring users whose own affiliation is authenticated and displayed by graphical indication of affiliation be shown the graphical indication of affiliation of the avatar's user.

In an embodiment, the avatar's user may not be informed of an enquiring user's request to authenticate and to display the graphical indication of affiliation of the avatar's user. Or, an entity may specify that a class of enquiring users be empowered to request authentication of affiliation and display to them the graphical indication of affiliation of the avatar's user. For example, door monitors to an event sponsored by an entity may be appointed by the entity to check affiliations of users with avatars that attempt to enter the event. This class of door monitor users may request authentication of affiliation.

In an embodiment, a display space at the avatar, upon authentication of affiliation, displays a QR code or other barcode. Other users who are also affiliated with the same entity as the avatar's user, or who otherwise are told of the QR code or other barcode may scan the code to learn the affiliation of the avatar's user. For example, it may be desired that employees of an entity be able to recognize each other on the digital platform. By scanning the QR code or other barcode provided on or at the user's avatar, for example, using their mobile devices, a webpage may be opened showing the authenticated affiliation of the avatar's user. According to an aspect of the disclosure, users may have to enter their credentials to access the webpage, thus restricting display of the graphical indication of affiliation of the avatar's user to users who scan the code and also have the appropriate credentials.

If additional users are authorized ("yes" at 1712), then at 1714 the graphical indication of affiliation is generated also for additional users.

On the other hand, if the graphical indication of affiliation is not authorized for additional users ("no" at 1712) then at 1716 the graphical indication of affiliation of the user of the avatar is generated only for the inquiring user.

At 1718, it is determined whether the authentication of the affiliation is due to expire at a certain time and, if so, whether the authentication of affiliation has expired for the user of the avatar. According to an aspect of the disclosure, upon authentication, the graphical indication of affiliation of the avatar's user is displayed only for a specified time period. For example, an avatar's user may be invited to an event on the digital platform by an entity. The authentication may thus expire based on the ticket for the event. Accordingly, the graphical indication of affiliation of the avatar's user may be displayed starting at a specified time before the event and expire at a specified time after the event. Or, the avatar's user may be hired for a specified project of an entity and thus the authentication of affiliation may expire after the completion of the project or at a specified date/time thereafter. In such a scenario, the graphical indication of affiliation of the avatar's user may disappear after the completion of the project or at the specified date/time. The authenticating server 320 may keep track of such time restrictions for user affiliation and may communicate the time restrictions to the digital platform 300 at the time of authentication. Digital platform 300 may then keep track of the time restriction and automatically cut off display of the graphical indication of affiliation at the expiration of the time specified by the time restriction. In the alternative, in addition, authenticating server 320 may keep track of the time restriction and at the specified time transmit to digital platform 300 an indication that the user of the avatar is no longer authenticated for affiliation with the entity.

Such time restrictions on when a user may be authenticated, and thus when the graphical indication of affiliation may be displayed, may also be implemented for other embodiments herein, for example, for access by the avatar to a portion of the digital platform 300, and for other embodiments.

The graphical indication of affiliation of the avatar's user may also show the specified time for which the authentication of affiliation is valid. In this example, the graphical indication of affiliation of the avatar's user may indicate that the affiliation ends at a specified date/time or that the affiliation ends after a specified event, for example, after an event is over.

If at 1718 authentication of affiliation has expired then processing is stopped. Otherwise if the authentication has not expired ("no" at 1718) then at 1720 display of the graphical indication of user affiliation is continued and is checked again at 1718. If the user session ends and the avatar is no longer displayed on the digital platform 300, then display of the graphical indication of affiliation also stops.

Improved computer-implemented methods, non-transitory computer-readable mediums, and means for implementing such methods are described. Improvements are described that result in a more secure online digital platform, in which users can be more confident in the other users with whom they interact, and in which affiliated entities can feel more secure in their brands. In addition, a visually enhanced, more transparent, and user-friendly digital platform is described. Also, improved access control, depending on affiliation of the user and access policy, may be achieved for users navigating the digital platform 300 or interacting with other users on the digital platform 300.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. If desired, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be effected to the particular embodiments by those of skill in the art without departing from the scope of the present application, which is defined solely by the claims appended hereto.

What is claimed is:

1. A method of access control based on user affiliation, the method comprising:
generating, by a host server of a digital platform, a display of a first avatar of a first user of the digital platform;
receiving, by the host server, a request to access by the first avatar a portion of the digital platform;
transmitting to an authenticating server, by the host server, a request to authenticate an affiliation between the first user and an entity;

receiving, by the host server, an affiliation authentication from the authenticating server;

based at least in part on the affiliation authentication received, enabling access of the first avatar to the portion of the digital platform;

generating for display, simultaneously with display of the first avatar, a graphical indication of the affiliation between the first user and the entity;

based at least in part on the affiliation authentication received, preventing the first avatar with the display of the graphical indication from entering a second portion of the digital platform; and enabling a second avatar without the display of the graphical indication to enter the second portion of the digital platform.

2. The method of claim 1, further comprising:

based on the affiliation authentication received, enabling the first avatar to enter the portion of the digital platform only with the display of the graphical indication.

3. The method of claim 1, further comprising:

obtaining an access policy from the authenticating server; and determining, according to the access policy, the access to the portion of the digital platform.

4. The method of claim 1, wherein the portion of the digital platform is an area on the digital platform.

5. The method of claim 1, wherein the portion of the digital platform is a virtual object on the digital platform.

6. The method of claim 1, wherein the portion of the digital platform is interaction with a second avatar.

7. The method of claim 1, wherein the portion of the digital platform is an action of the first avatar.

8. The method of claim 1, wherein the affiliation authentication received comprises an indication of a rank of the first user with the entity, and wherein the generating of the display comprises generating display of an identification of the first rank as part of the graphical indication of the affiliation.

9. The method of claim 1, wherein the affiliation authentication received comprises an indication of a rank of the first user with the entity, and the preventing of the access of the avatar to the portion of the digital platform is based on the rank.

10. The method of claim 1, wherein the preventing of the access of the first avatar to the portion of the digital platform is limited to a specified time.

11. The method of claim 1, wherein the affiliation authentication received comprises an indication of a rank of the first user with the entity, and enabling of the access of the first avatar to a second portion of the digital platform is limited, according to the rank, to a specified time.

12. The method of claim 1, wherein the digital platform is a multi-user virtual world platform.

13. The method of claim 1, wherein the graphical indication of the affiliation is a logo of the entity displayed at the first avatar.

14. A system of user affiliation-based access control, the system comprising:

processing circuitry of a host server of a digital platform configured to generate a display of a first avatar of a first user of the digital platform; and input/output circuitry of the host server configured to receive a request to access by the first avatar a portion of the digital platform;

the processing circuitry further configured:

to transmit to an authenticating server a request to authenticate an affiliation between the first user and an entity;

to receive an affiliation authentication from the authenticating server;

to enable, based at least in part on the affiliation authentication received, access of the first avatar to the portion of the digital platform;

to generate for display, simultaneously with display of the first avatar, a graphical indication of the affiliation between the first user and the entity;

based at least in part on the affiliation authentication received, to prevent the first avatar with the display of the graphical indication from entering a second portion of the digital platform; and to enable a second avatar without the display of the graphical indication to enter the second portion of the digital platform.

15. The system of claim 14, wherein the processing circuitry is configured to enable the first avatar, based on the affiliation authentication received, to enter the portion of the digital platform only with the display of the graphical indication.

16. The system of claim 14, wherein the processing circuitry is configured:

to obtaining an access policy from the authenticating server; and to determine, according to the access policy, the access to the portion of the digital platform.

17. A method of access control based on user affiliation, the method comprising:

generating, by a host server of a digital platform, a display of an avatar associated with a first user profile of the digital platform, wherein the first user profile is associated with a first user;

receiving, by the host server, a request associated with the avatar to access a portion of the digital platform;

transmitting to an authenticating server, by the host server, a request to authenticate an affiliation between the first user and a real world entity;

receiving, by the host server, an affiliation authentication from the authenticating server;

based at least in part on the affiliation authentication received, enabling access of the avatar to the portion of the digital platform;

determining that the avatar is being generated for display by a device associated with a second user profile of the digital platform, wherein the second user profile is associated with a second user distinct from the first user; and based at least in part on the determining that the avatar is being generated for display by the device associated with the second user profile, and based at least in part on the affiliation authentication received: generating for display by the device associated with the second user profile, simultaneously with display of the avatar, a graphical indication of the affiliation between the first user and the entity.

* * * * *